US011017595B2

(12) United States Patent
Pekelny et al.

(10) Patent No.: US 11,017,595 B2
(45) Date of Patent: May 25, 2021

(54) OBJECT SEGMENTATION USING HIGH-LEVEL STRUCTURAL MESHES

(71) Applicant: MICROSOFT TECHNOLOGY LICENSING, LLC, Redmond, WA (US)

(72) Inventors: Yuri Pekelny, Seattle, WA (US); Rahul Sawhney, Kirkland, WA (US); Muhammad Jabir Kapasi, Sammamish, WA (US); Szymon P. Stachniak, Redmond, WA (US); Michelle Lynn Brook, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/666,786

(22) Filed: Oct. 29, 2019

(65) Prior Publication Data

US 2021/0125407 A1    Apr. 29, 2021

(51) Int. Cl.
*G06T 15/30* (2011.01)
*G06T 17/20* (2006.01)
(Continued)

(52) U.S. Cl.
CPC ............ *G06T 17/20* (2013.01); *G06F 17/18* (2013.01); *G06N 20/00* (2019.01); *G06T 7/10* (2017.01); *G06T 2207/10012* (2013.01)

(58) Field of Classification Search
CPC ....... G06T 17/20; G06T 17/205; G06T 15/04; G06T 15/005; G06T 11/40
(Continued)

(56) References Cited

U.S. PATENT DOCUMENTS

| 2012/0195471 | A1* | 8/2012 | Newcombe ............ G06T 7/194 |
| | | | 382/106 |
| 2014/0184749 | A1* | 7/2014 | Hilliges ................. G06T 17/00 |
| | | | 348/47 |
| 2018/0158235 | A1 | 6/2018 | Wu et al. |

OTHER PUBLICATIONS

Han, X., etc. Image-based 3D Object Reconstruction: State-of-the-Art and Trends in the Deep Learning Era, Deep Learning-based 3D Object Reconstruction—A Survey, 2005. [Online], [Retrieved on Oct. 22, 2020]. Retrieved from the internet: <URL: https://arxiv.org/pdf/1906.06543.pdf> (Year: 2005).*

(Continued)

*Primary Examiner* — Gordon G Liu
(74) *Attorney, Agent, or Firm* — Workman Nydegger

(57) ABSTRACT

Improved techniques for performing object segmentation are disclosed. Surface reconstruction (SR) data corresponding to an environment is accessed. This SR data is used to generate a detailed three-dimensional (3D) representation of the environment. The SR data is also used to infer a high-level 3D structural representation of the environment. The high-level 3D structural representation is inferred using machine learning that is performed on the surface reconstruction data to identify a structure of the environment. The high-level 3D structural representation is then cut from the detailed 3D representation. This cutting process generates a clutter mesh comprising objects that remain after the cut and that are distinct from the structure. Object segmentation is then performed on the remaining objects to identify those objects.

20 Claims, 17 Drawing Sheets

(51) Int. Cl.
*G06F 17/18* (2006.01)
*G06T 7/10* (2017.01)
*G06N 20/00* (2019.01)

(58) Field of Classification Search
USPC .......................................................... 345/423
See application file for complete search history.

(56) References Cited

OTHER PUBLICATIONS

Filliat, et al., "RGBD Object Recognition and Visual Texture Classification for Indoor Semantic Mapping", In Proceedings of the IEEE International Conference on Technologies for Practical Robot Applications, Apr. 23, 2012, pp. 127-132.
"International Search Report and Written Opinion Issued in PCT Application No. PCT/US20/056736", dated Jan. 13, 2021, 15 Pages.
Rusu, et al., "Model-based and Learned Semantic Object Labeling in 3D Point Cloud Maps of Kitchen Environments", In IEEE/RSJ International Conference on Intelligent Robots and Systems, Oct. 10, 2009, pp. 3601-3608.
Silberman, et al., "Indoor Segmentation and Support Inference from RGBF Images", In Proceedings of the 12th European Conference on Computer Vision—vol. Part V, Oct. 7, 2012, pp. 746-760.

\* cited by examiner

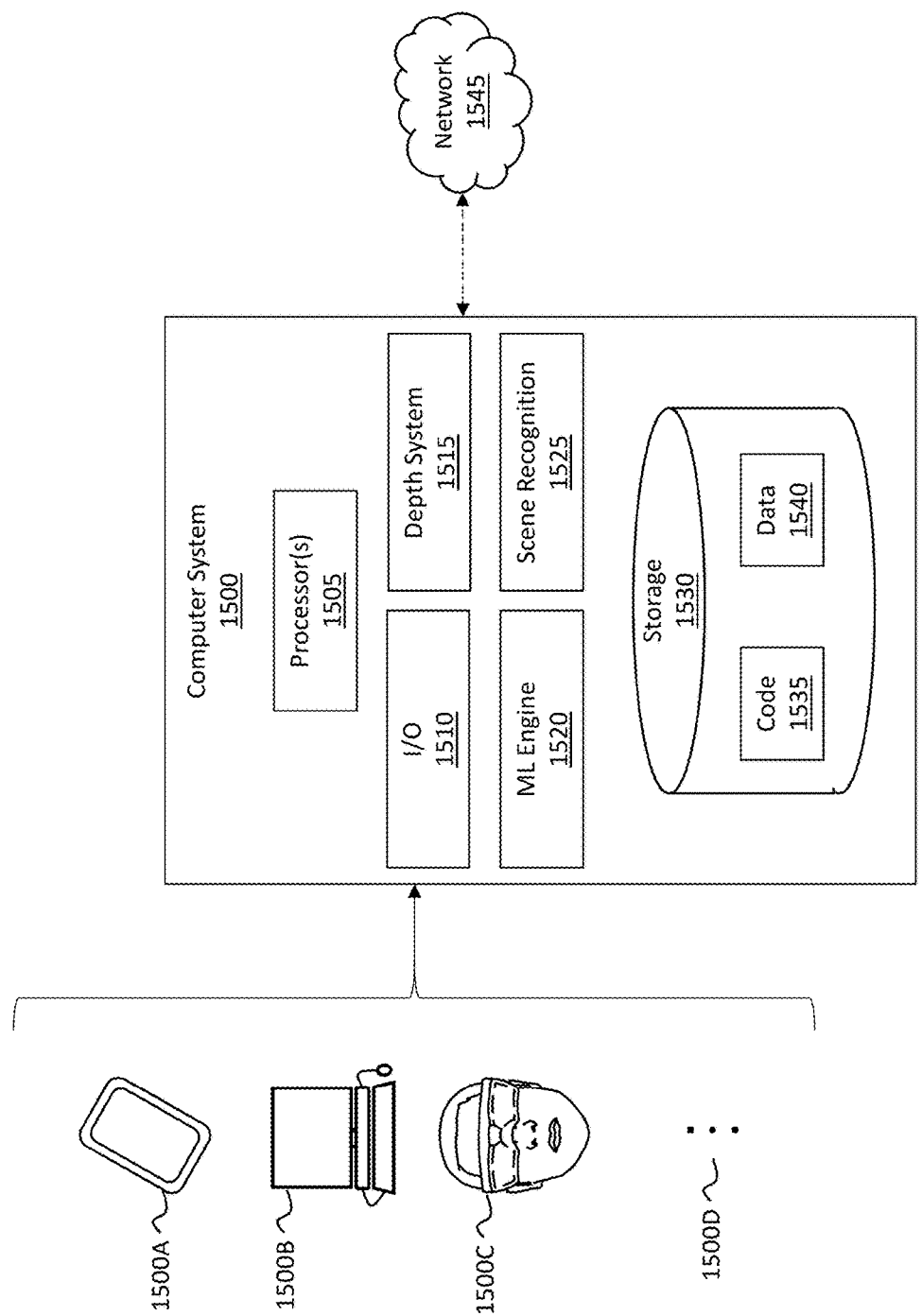

US 11,017,595 B2

OBJECT SEGMENTATION USING HIGH-LEVEL STRUCTURAL MESHES

BACKGROUND

Mixed-reality (MR) systems/devices include virtual-reality (VR) and augmented-reality (AR) systems. Conventional VR systems create completely immersive experiences by restricting users' views to only virtual images rendered in VR scenes/environments. Conventional AR systems create AR experiences by visually presenting virtual images that are placed in or that interact with the real world. As used herein, VR and AR systems are described and referenced interchangeably via use of the phrase "MR system." As also used herein, the terms "virtual image," "virtual content," and "hologram" refer to any type of digital image rendered by an MR system. Furthermore, it should be noted that a head-mounted device (HMD) typically provides the display used by the user to view and/or interact with holograms provided within an MR scene.

Some computer systems, including some HMDs, include a depth detection system. Using this depth detection system, the computer system is able to scan an environment in order to generate scanning data that is based on depth data and pose data. This scanning data can then be used to generate a digital three-dimensional (3D) representation of that environment.

The digital 3D representation is often relied upon by an MR system when visually placing/rendering holograms in an MR scene. For instance, using Simultaneous Location And Mapping (SLAM), the MR system's head tracking and IMU units can calculate and determine a user's position relative to the environment and use the digital 3D representation to render or update holograms in the MR scene, as needed.

Traditional digital 3D representations are comprised of polygons (e.g., 3D triangles) that are shaped and oriented in specific configurations to represent the shapes, contours, and geometries of an environment, including any objects within the environment. Often, these traditional representations included thousands, tens of thousands, hundreds of thousands, and even multiple millions of differently shaped polygons. These polygons are then relied on to perform object recognition (i.e. semantic or object segmentation). One will appreciate, however, that the process of generating, processing, and updating these polygons requires a large amount of resources. Performing object recognition using all these polygons also requires a large amount of resources. What is needed, therefore, is an improved technique for generating digital 3D representations and for performing object recognition. Additionally, while large portions of this disclosure focus on the use of a MR system, the principles described herein are not limited to scenarios involving only MR systems. Rather, the disclosed principles may be practiced by any computing device, without limit.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, methods, and devices (e.g., wearable devices, head-mounted devices, hardware storage devices, etc.) that improve how digital 3D representations are generated and how object segmentation is performed.

In some embodiments, surface reconstruction (SR) data corresponding to an environment is accessed. This SR data is then used to generate a detailed three-dimensional (3D) representation of the environment. Additionally, the SR data is used to infer a high-level 3D structural representation of the environment. Here, the high-level 3D structural representation is inferred using machine learning that is performed on the SR data to identify a structure of the environment. The high-level 3D structural representation is then cut from the detailed 3D representation. This cutting process generates a clutter mesh comprising objects that remain after the cut and that are distinct from the structure. Semantic, aka "object," segmentation is then performed on the remaining objects to identify those objects.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 11 also illustrates how the cutting process causes each object embodied within the clutter mesh to have its own corresponding SR mesh such that multiple distinct SR meshes are generated (e.g., one for each object).

FIG. 15 illustrates an example computer system capable of performing any of the disclosed operations.

DETAILED DESCRIPTION

Figure 1:
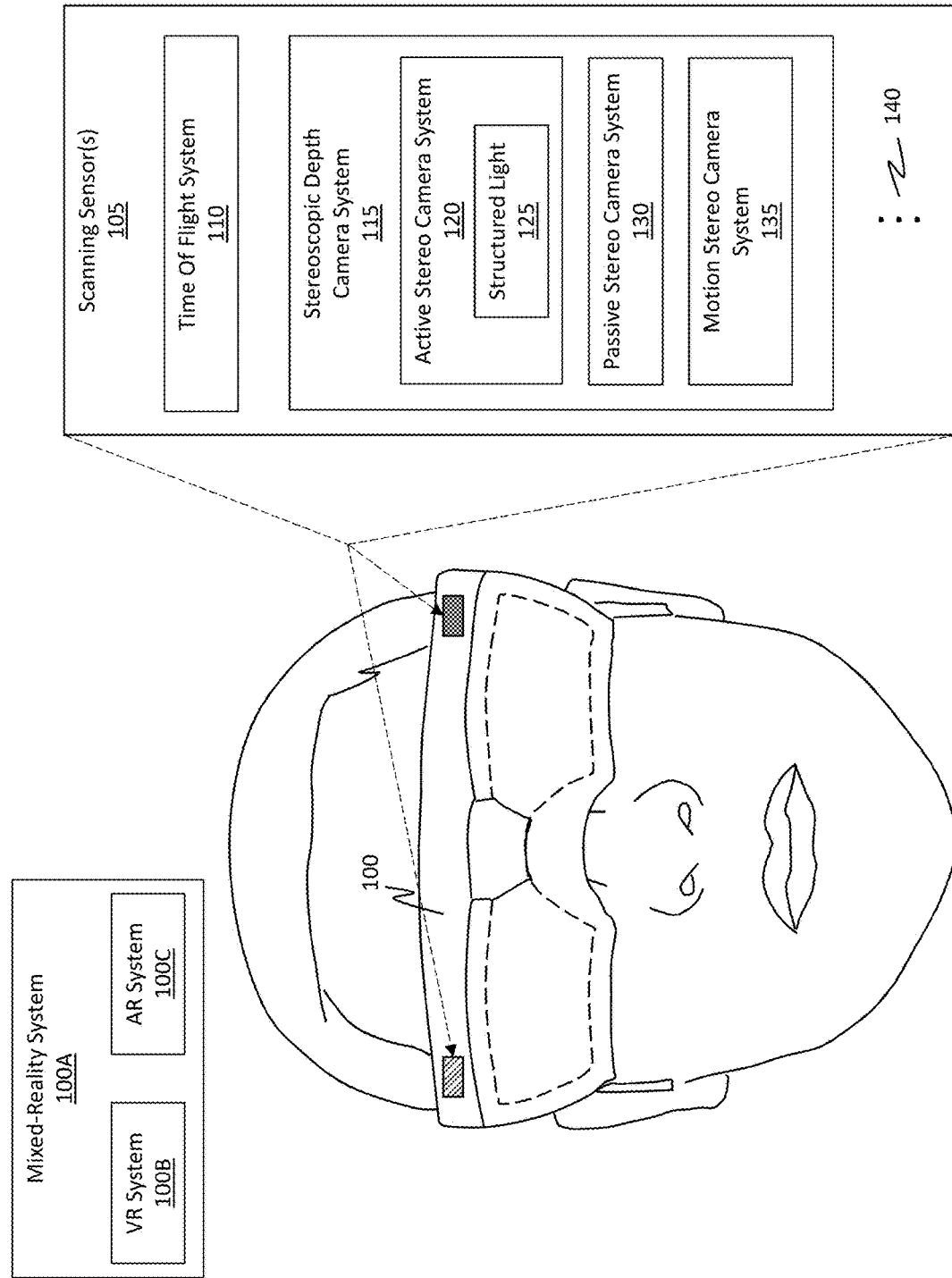
FIG. 1 illustrates an example of a computer system (e.g., an HMD) that includes a depth detection system with scanning sensors, where the system is capable of identifying, generating, and/or processing depth data to generate a digital 3D representation (e.g., an SR mesh, a 3D point cloud, a depth map, etc.) of an environment.

Embodiments disclosed herein relate to systems, methods, and devices (e.g., wearable devices, HMDs, hardware storage devices, etc.) that improve how digital 3D representations are generated and how object segmentation is performed.

In some embodiments, SR data corresponding to an environment is accessed. This SR data is used to generate a detailed 3D representation of the environment. Additionally, the SR data is used to infer (e.g., via machine learning) a high-level 3D structural representation of the environment. The high-level 3D structural representation is then cut from the detailed 3D representation to generate a clutter mesh. Non-structural remaining objects are then identified within the clutter mesh using semantic/object segmentation.

While a large portion of this disclosure focuses on the use of an HMD or MR system to perform the disclosed operations and principles, it will be appreciated that the disclosed embodiments may be practiced by any computing device, without limit. Indeed, any type of mobile device, wearable device, laptop, desktop, server, datacenter, gaming system, vehicle-based computing system, or any other type of computing device may be used to perform the disclosed operations. The disclosed principles may be practiced in both an online environment (e.g., a device connected to a network, such as the Internet) and an offline environment.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments are able to significantly improve how SR meshes are generated and managed. Additionally, the embodiments help improve object MR (e.g., displaying and manipulating holograms relative to objects in an environment).

Traditionally, an entire environment was represented by a single highly complex SR mesh comprising a large number of polygons. Using, updating, or manipulating this highly complex SR mesh was not an easy task and typically required an extensive amount of computing resources.

The disclosed embodiments improve how SR meshes are generated and used by effectively breaking the single large SR mesh up into multiple discrete SR meshes. This break-up process is performed by identifying structural features of the environment and then stripping the detailed SR mesh of those structural features. In performing this stripping or cutting operation, the detailed SR mesh is effectively decomposed into multiple discrete SR meshes, with each individual mesh corresponding to a different object in the environment. Each resulting SR mesh can then operate as a respective layer and can be manipulated individually without having to manipulate an entire highly complex and large SR mesh. Among other improvements, the embodiments significantly improve how SR meshes are managed.

The disclosed embodiments beneficially make no assumption regarding sensor characteristics, no assumptions regarding how a detailed SR mesh is generated, and no assumptions regarding scene or environment structure. Furthermore, the disclosed embodiments can operate in a fully unsupervised mode and can even work under sparse environmental coverage or scanning conditions.

Example HMDs & Depth Detection Systems

Attention will now be directed to FIG. 1, which illustrates an example of a head-mounted device (HMD) 100. HMD 100 can be any type of mixed-reality system 100A, including a VR system 100B or an AR system 100C. It should be noted that while a substantial portion of this disclosure is focused on the use of an HMD to scan a room/environment, the embodiments are not limited to being practiced using only an HMD. That is, any type of scanning system can be used, even systems entirely removed or separate from an HMD. As such, the disclosed principles should be interpreted broadly to encompass any type of scanning scenario or device. Some embodiments may even refrain from actively using a scanning device themselves and may simply use the data generated by the scanning device. For instance, some embodiments may be practiced in a cloud computing environment.

HMD 100 is shown as including scanning sensor(s) 105 (i.e. a type of depth detection system), and HMD 100 can use the scanning sensor(s) 105 to scan and map any kind of environment (e.g., by generating a 3D representation of the environment). Scanning sensor(s) 105 may comprise any number or any type of scanning devices, without limit. As used herein, a "3D representation" includes, but is not limited to, any type of surface reconstruction (SR) mesh (e.g., a mesh that includes polygons or 3D triangles whose shape and orientation digitally represents and describes the shapes, geometries, and contours of an environment), a 3D point cloud (e.g., a compilation of dots or points that are used to digitally represent the environment), depth maps, or any other 3D digital representation of the environment.

The scanning sensor(s) 105 can be used to scan and map out an environment, including any objects in the environment. To do so, the scanning sensor(s) 105 typically uses its depth sensors (e.g., depth cameras) to obtain one or more depth images of the environment. These depth images include depth data detailing the distance from the sensor to any objects captured by the depth images (e.g., a z-axis range or measurement). Once these depth images are obtained, then a depth map can be computed from the data in the images. A depth map details the positional relationship and depths relative to objects in the environment. Consequently, the positional arrangement, location, geometries, contours, and depths of objects relative to one another can be determined. From the depth maps (and possibly the depth images), a 3D representation of the environment can be generated.

As shown, in some embodiments, scanning sensor(s) 105 include a time of flight (TOF) system 110 and/or a stereoscopic depth camera system 115. Both of these types of depth sensing systems are generally known in the art and will not be described in detail herein.

In some embodiments, the stereoscopic depth camera system 115 may be configured as an active stereo camera system 120, which projects light (e.g., visible light and/or infrared light) into the environment to better determine depth. In some cases, the projected/illuminated light is structured light 125 (e.g., light that is projected using a known pattern so as to provide artificial texture to the environment). In some embodiments, the stereoscopic depth camera system 115 is configured as a passive stereo camera system 130 or perhaps even as a motion stereo camera system 135. The ellipsis 140 is provided to illustrate how the scanning sensor(s) 105 may include any number and/or any other type of depth sensing unit. As such, the embodiments are not limited to only those units shown in FIG. 1.

Figure 2:
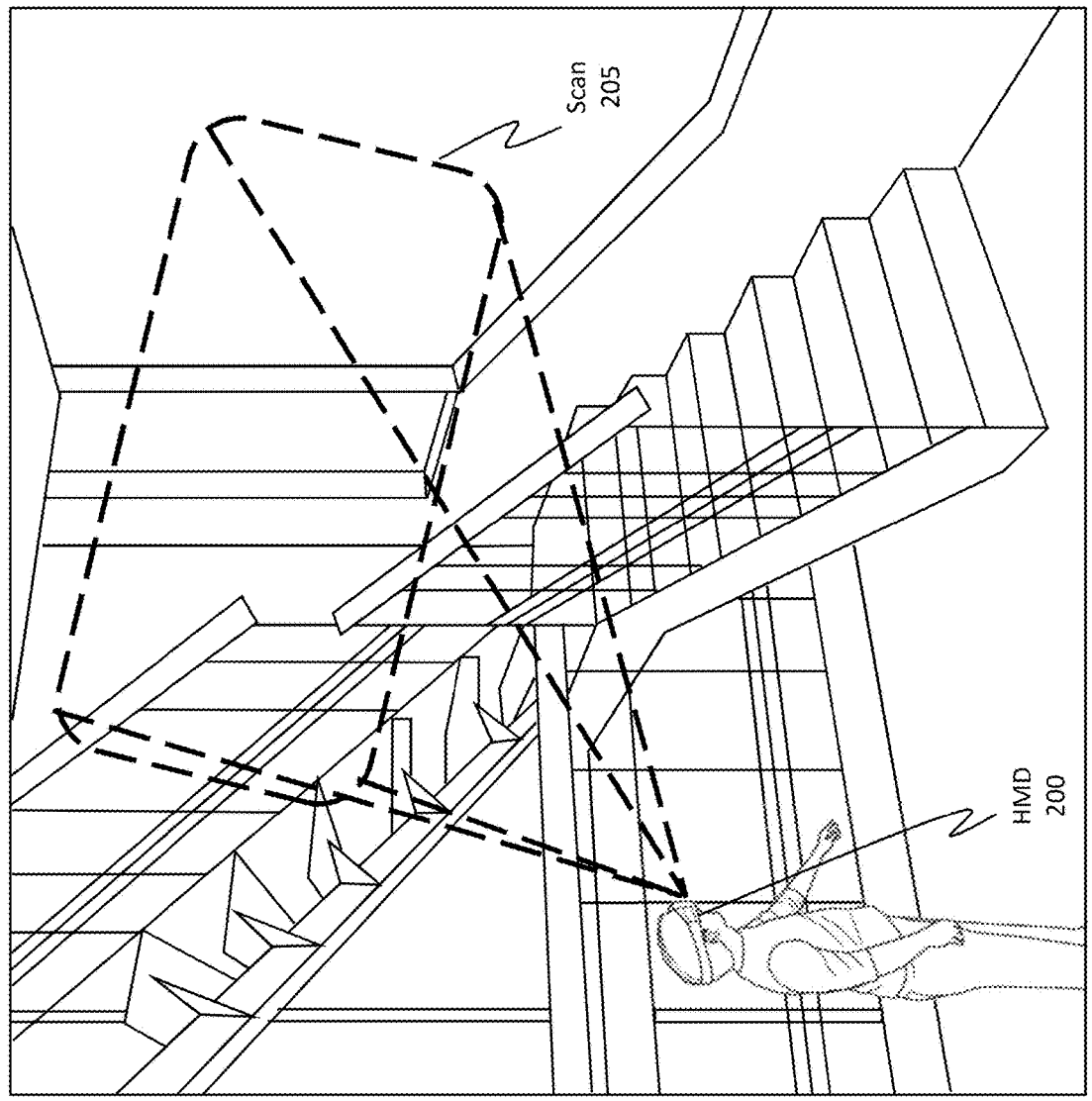
FIG. 2 illustrates an example scenario in which a depth scanning device (e.g., an HMD) is being used to generate depth scanning data (aka SR data) of an environment by scanning the environment using depth sensors or cameras on the device.

FIG. 2 shows how scanning sensors (e.g., scanning sensor(s) 105 from FIG. 1) can be used to scan an environment to generate scanning data. FIG. 2 shows how an HMD 200, which is representative of HMD 100 from FIG. 1, can be used to perform a scan 205 to generate scanning data 210. One will appreciate that any type of scanning sensor can be used, and the scanning sensor need not be included as a part of an HMD.

With regards to FIG. 2, the user wearing the HMD 200 will navigate the environment (e.g., in this case, the environment is a stairway corridor) to aim the scanning sensors at the different areas of the environment. During this time, the scanning sensors will generate the scanning data 210, which will subsequently be used to map out the environment (e.g., by generating a digital 3D representation of the environment). If the user aims the scanning sensors at every portion of the environment for a threshold period of time, then a highly detailed, accurate, and robust 3D representation of the environment can be generated. On the other hand, if the user fails to aim the scanning sensors at every area or perhaps if the user fails to aim the scanning sensors for the threshold period of time, then the resulting 3D representation may not be as robust as it otherwise could have been (e.g., the representation may have holes in its scene understanding). Regardless, it is often the case that the resulting 3D representation includes a large amount of highly complex data, as described earlier.

Figure 3:
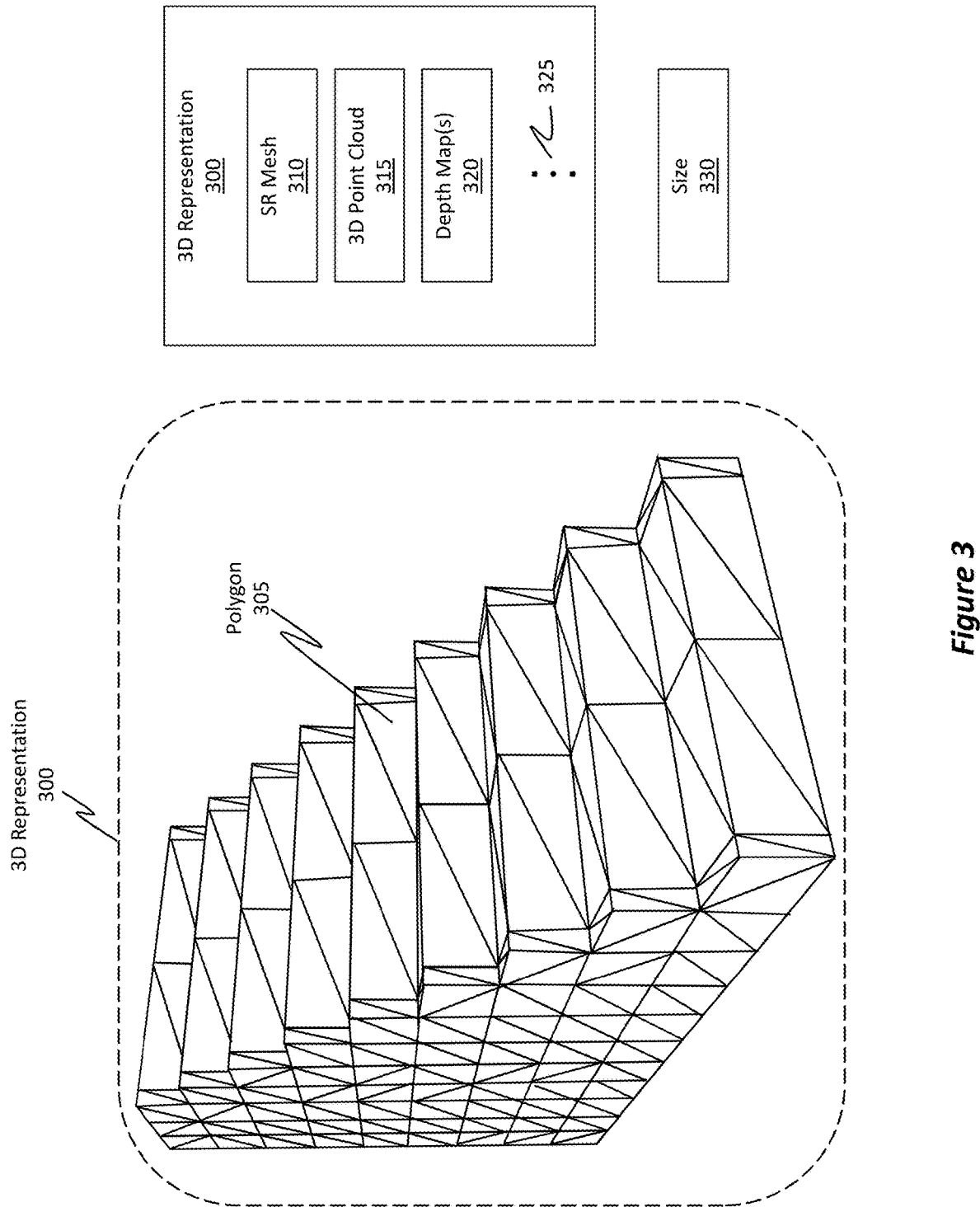
FIG. 3 provides an example illustration of how a digital 3D representation of an object or environment may be formed from different polygons (e.g., 3D triangles) shaped or oriented to represent the shapes, geometries, or contours of an object or environment.

FIG. 3 shows an example of how a 3D representation 300 may be formulated. This 3D representation 300 can be generated based on the scanning data 210 from FIG. 2. One will appreciate that the 3D representation 300 can be generated (or at least its generation can be started) while the HMD 200 is currently scanning an environment. Additionally, or alternatively, the 3D representation 300 can be generated after the environment in scanned. In some cases, the scanning data 210 from FIG. 2 is stored locally on the HMD 200 while in other cases the scanning data 210 can be stored in a remote repository (e.g., a cloud storage system). If stored in the cloud, then a cloud service can be used to generate the 3D representation 300 based on the scanning data 210.

As shown in FIG. 3, in some embodiments, the 3D representation 300 is comprised of any number of polygons 305 (e.g., 3D triangles). These polygons 305 are shaped and oriented in different configurations to symbolically, or rather digitally, represent an object. FIG. 3, for example, shows how the different polygons 305 are shaped and oriented in a manner to digitally reflect or represent a staircase, such as the staircase shown in FIG. 2. Each stair in the staircase is digitally represented by a number of different polygons.

Based on this principle, it will be appreciated that any type of object (not just stairs) may be digitally represented in the form of polygons. One will further appreciate that while the remaining portions of this disclosure focus on specific examples related to stairwell and staircase environments, the disclosed principles can be practiced in any environment, without limitation.

The 3D representation 300 may comprise different types of 3D constructs. Some of these constructs include, but are not limited to, a surface reconstruction (SR) mesh 310 (which is depicted in FIG. 3 by the compilation of the polygons 305), a 3D point cloud 315, or any number of depth map(s) 320. The ellipsis 325 is provided to illustrate how the 3D representation 300 may include or may be embodied as any other type of digital 3D construct.

FIG. 3 also refers to a size 330 of the 3D representation 300. Often, size 330 is quite large. For instance, if the size 330 were described relative to the number of polygons (e.g., polygons 305), then the number of polygons included in the 3D representation 300 can be in the thousands or even millions range. For instance, the relatively "simple" geometric staircase shape shown in FIG. 3 may include many thousands of polygons. More complex geometrical shapes (e.g., a person's face) will result in the use of many more polygons. Processing such a large number of polygonal data can consume a substantial percentage of the available compute power. As such, it is desirable to improve how 3D representations are generated and to improve how objects are identified or recognized from within the 3D representations.

Improved Techniques for Generating SR Meshes and for Recognizing Objects

Figure 4:
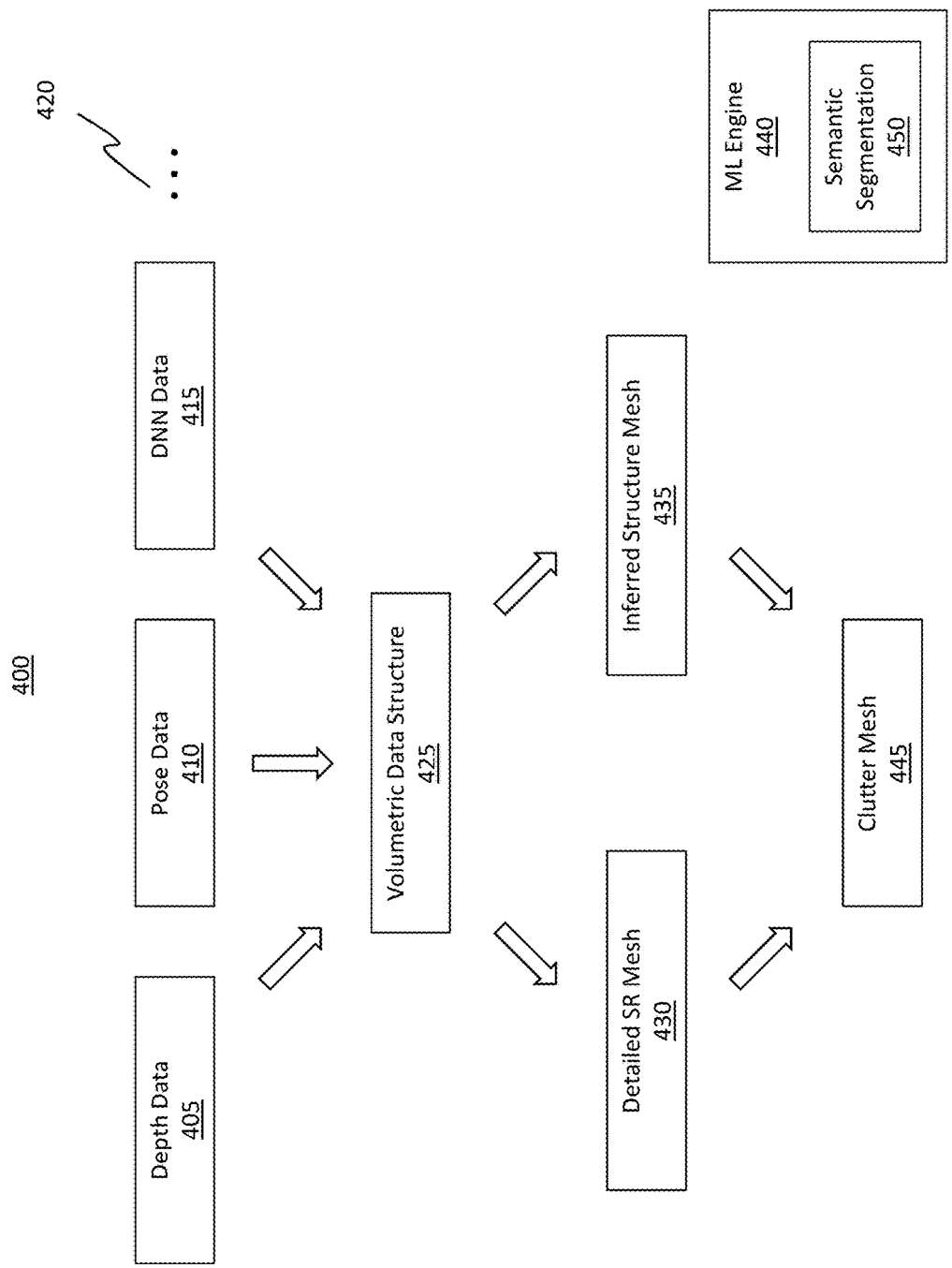
FIG. 4 illustrates a flow diagram of an example process or algorithm for generating a high-level structural representation of an environment and using that high-level structural representation to perform semantic/object segmentation.

FIG. 4 illustrates an example process 400 for improving how SR meshes are generated and for improving how objects are recognized or identified within those SR meshes. Initially, the process 400 shows how numerous different types of data can be acquired in order to subsequently generate a 3D representation of an environment.

By way of example, depth data 405 can be acquired, such as from the depth sensor(s) 105 described in FIG. 1. Pose data 410 can also be acquired. Pose data 410 can be generated from any number of IMUs, gyroscopes, global positioning system (GPS) data, head or hand tracking cameras, depth sensors, or any other type of position-determining device. Deep neural network (DNN) data 415 can also be used, generated, or otherwise relied on. The ellipsis 420 symbolically illustrates how other types of data may also be generated or accessed in order to create the 3D representation of the environment.

As used herein, DNN data 415 can be generated from any type of "machine learning" engine, module, or component. Reference to any type of machine learning within this disclosure may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations (e.g., to process scanning data to identify objects and to perform other operations).

The depth data 405, pose data 410, and the DNN data 415 may be compiled together to form a large corpus of data referred to as a volumetric data structure 425. One will appreciate that the volumetric data structure 425 can be stored in a local device. Additionally, or alternatively, the volumetric data structure 425 can be stored in a remote repository, such as in a cloud storage device or other networked device.

In accordance with the disclosed principles, the embodiments are able to analyze the volumetric data structure 425 to generate a detailed SR mesh 430, such as the SR mesh 310 from FIG. 3 or, more broadly, the 3D representation 300. This detailed SR mesh 430 includes intricate and highly detailed information describing the shapes, contours, and geometries of an environment. When the SR mesh 430 is formed from polygons (or 3D triangles), such as polygons 305 of FIG. 3, then this SR mesh 430 may include any number of polygons, without limit. Additionally, this detailed SR mesh 430 is often a single SR mesh (as described earlier), which means the single comprehensive detailed SR mesh 430 will often describe numerous different and distinct objects within an environment.

By way of example, suppose the detailed SR mesh 430 digitally represented the stairway environment illustrated in FIG. 2. In such a case, the single mesh would include information describing the stairs, the handrail, the walls, any windows, the floor, the ceiling, and any other feature or object included within that stairway environment (provided those features were sufficiently scanned). Such a construct (i.e. the detailed SR mesh 430), as a consequence, is often extremely large and can consume a large amount of resources to process or work with.

In accordance with the disclosed principles, the embodiments also generate a so-called "inferred structure mesh" 435 (aka a "high-level structure mesh" and other synonymous terms). Further detail on the inferred structure mesh 435 will be provided later, but by way of a brief introduction, the inferred structure mesh 435 is also generated based on the volumetric data structure 425 and is generated through the use of machine learning (e.g., a machine learning (ML) engine 440). As will be described in further detail later, the ML engine 440 identifies structural features of the environment from within the volumetric data structure 425.

In some cases, the embodiments additionally use computer vision (i.e. a technique for a computer to interpret and understand the visual world) to identify the structural features. Therefore, identifying structure can be performed by a combination of different machine learning techniques and computer vision techniques. As used here, the term "structure" (and its synonyms or related terms) generally refers to any type of support feature of the environment and/or to any other geometric object that satisfies certain design parameters (to be discussed later).

By way of example, support or structural features of an environment include, but are not limited to, any type of wall structure, floor structure, ceiling structure, load-bearing platform or structure, pillars, and so forth. Examples of geometric objects include, but are not limited to, any type of planar region, geometric region, or any other object that satisfies certain structure-classification design parameters.

These structural features are inferred by the ML engine 440 based on training the ML engine 440 has previously undergone (and perhaps is currently undergoing). For instance, the ML engine 440 is able to identify walls, floors, ceilings, and load-bearing platforms based on its past and ongoing training.

As one example, and with reference to the stairway shown in FIG. 2, the ML engine 440 is able to identify the stairs and recognize, detect, or otherwise determine that each stair in the stairway is supported by an underlying frame or support (or the stair itself provides the frame/support). With that understanding, or rather based on identifying structural supports within the volumetric data structure 425, the ML engine 440 is able to generate the inferred structure mesh 435, which identifies, or rather digitally represents, the framework or supporting structures of the environment.

As a practical example, and with reference to the stairway shown in FIG. 2, the inferred structure mesh 435 may represent the environment in a simplified manner by digitally representing only structural features while omitting other extraneous objects. For instance, the inferred structure mesh 435 may not portray or include data corresponding to each step in the stairway, but rather may simply portray a simplified planar region corresponding to the structural support provided by the stairs. Further details on this aspect will be provided later.

Similarly, the handrails will likely not be classified as a structural support or feature for the environment as a whole, so the handrails will likely not be portrayed within the inferred structure mesh 435. The walls, on the other hand, are likely to be considered structural and will be included. Windows, however, will likely not be called out or included within the inferred structure mesh 435. Instead, the structural walls will be portrayed as a single simplified structural plane, and the windows will be effectively consumed within that plane.

One will appreciate that because the detailed SR mesh 430 and the inferred structure mesh 435 are based on the same volumetric data structure 425, then those two meshes will be based on the same coordinate axis and/or same reference positions. For instance, even though the stairway in FIG. 2 will be represented in different ways as between the detailed SR mesh 430 (e.g., perhaps each stair will be described in detail) and the inferred structure mesh 435 (e.g., perhaps only the underlying structural plane will be described), the two representations of that stairway will still be oriented and will still generally have the same coordinates as between the detailed SR mesh 430 and the inferred structure mesh 435.

Once the detailed SR mesh 430 and the inferred structure mesh 435 are generated, then a so-called "clutter mesh" 445 is generated. This clutter mesh 445 is generated by "cutting," removing, or otherwise extracting the features embodied within the inferred structure mesh 435 from the detailed SR mesh 430. In some instances, instead of cutting data from the detailed SR mesh 430, the data is cut or extracted from the volumetric data structure 425 in order to generate the clutter mesh 445. It should be noted that the term "cut" and its related terms (e.g., extracted, pulled, etc.) does not mean data is actually being deleted from either the detailed SR mesh 430 or the volumetric data structure 425; rather, it means that the cut data is being excluded or omitted from being included in the newly generated clutter mesh 445.

As a consequence of this cutting operation, the remaining objects (i.e. those objects included within the clutter mesh 445) correspond to specific objects within the actual environment. By removing the structural features, the embodiments are able to generate a clutter mesh that is significantly smaller in terms of data size (e.g., by orders of magnitude) relative to the detailed SR mesh 430. That is, the number of SR polygons included in the resulting clutter mesh is often substantially less than a number of SR polygons included in the detailed 3D representation. Relatedly, a number of SR polygons included in the high-level 3D structural representation is smaller (e.g., an order of magnitude) than a number of SR polygons included in the detailed 3D representation and sometimes even smaller than the number of SR polygons in the clutter mesh.

Additionally, by removing the structural features, the resulting clutter mesh 445 can be used to more effectively identify objects (e.g., by performing semantic segmentation 450 such as through the use of the ML engine 440). Each object, as a consequence of the cutting operation, will also have its own corresponding mesh as opposed to being wrapped up in or included within a single common mesh. By performing the disclosed operations, the embodiments significantly improve data management and the ability to distinguish and differentiate between objects.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
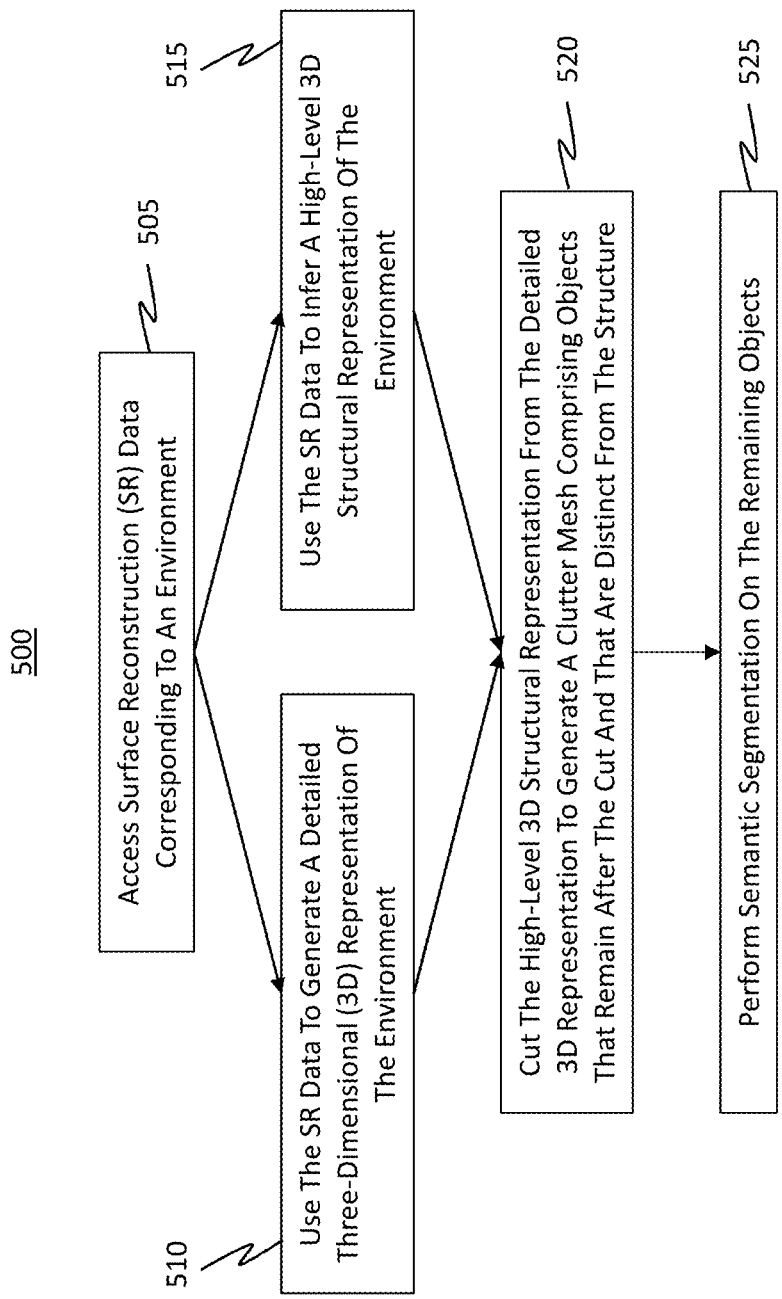
FIG. 5 illustrates a flowchart of an example method for using a high-level structural representation to perform semantic/object segmentation.

FIG. 5 illustrates a flowchart of an example method (500) for improving how object recognition is performed. That is, FIG. 5 describes in method-form the operations that were described generally in FIG. 4. Method 500 can be performed by different entities. For instance, in some embodiments, method 500 may be performed by a cloud service operating in a cloud network or environment. In some embodiments, method 500 may be performed by an HMD that is currently operating and scanning an environment. In some embodiments, method 500 may be performed by any other type of computer system.

Initially, method 500 includes an act (act 505) of accessing surface reconstruction (SR) data corresponding to an environment. By way of example, the SR data can include any of the depth data 405, pose data 410, or DNN data 415 mentioned in connection with FIG. 4. Additionally, this SR data can be generated in real-time by a scanning sensor, or it may have been generated previously and is now currently being accessed (e.g., either locally or from a remote repository).

Method 500 then includes an act (act 510) of using the SR data to generate a detailed three-dimensional (3D) representation (e.g., detailed SR mesh 430 from FIG. 4) of the environment.

Figure 6:
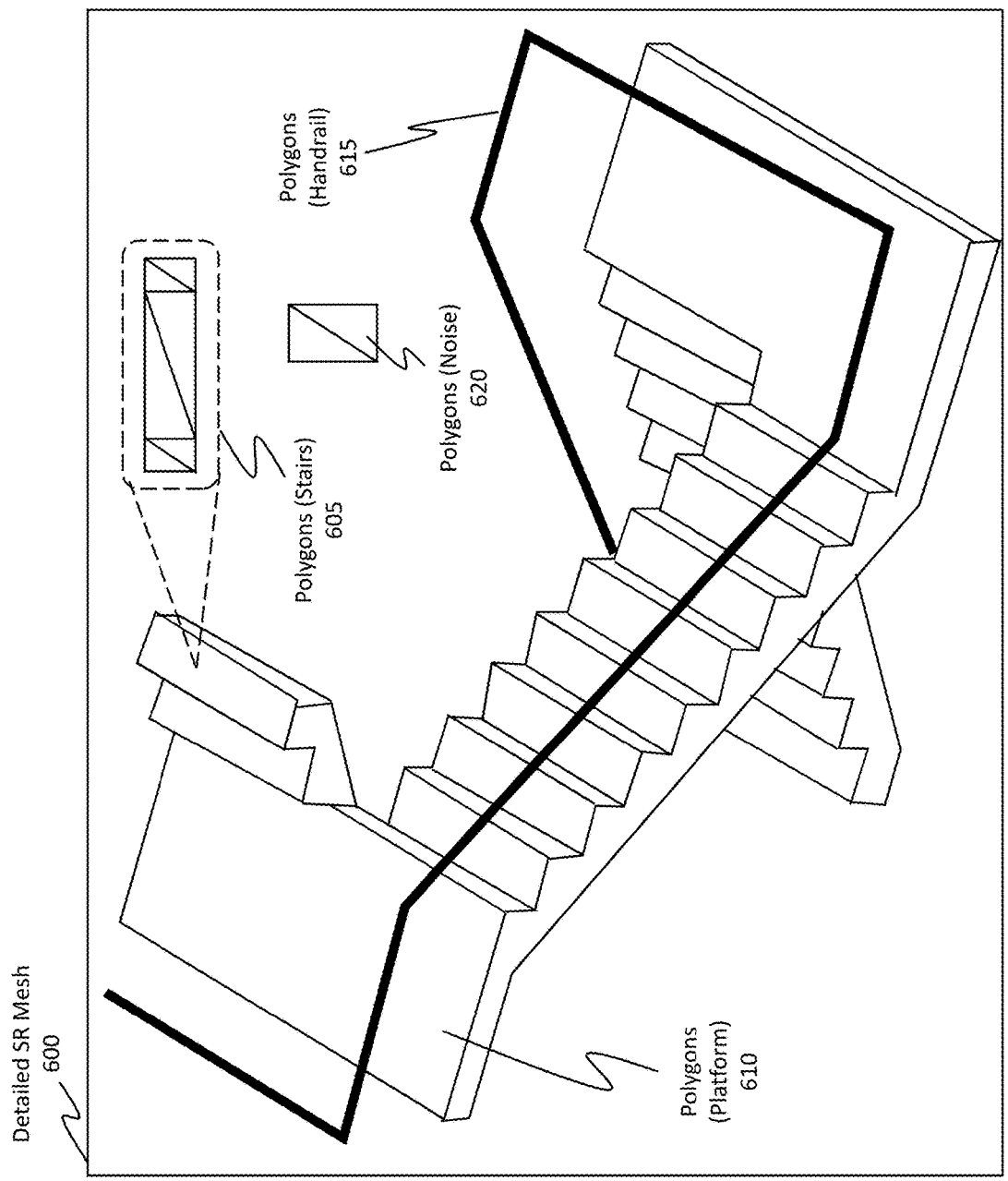
FIG. 6 illustrates how a detailed SR mesh may be generated from depth scanning data, where the detailed SR mesh includes substantial depth-related detail for the environment and where the depth details are all included within a single composite or comprehensive mesh.

Turning briefly to FIG. 6, this figure illustrates one example of a detailed SR mesh 600 that may be generated by method act 510. Detailed SR mesh 600 is shown as including different polygons, such as, for example, polygons 605, 610, 615, and 620. Polygons 605 are shown as corresponding to the stairs and further show a specific set of 3D triangles. The other polygons (i.e. polygons 610, 615, and 620), on the other hand, do not specifically illustrate or call out polygons. Instead, the illustration is simply referring to polygons. Referring to polygons (as opposed to actually illustrating them in the figure) is performed in an effort to not overly complicate the figure. As such, one will appreciate how the illustrated "meshes" may be comprised of actual polygons, as shown in FIG. 3, even if those polygons are not visually illustrated in the remaining figures.

FIG. 6 also shows how polygons 610 correspond to the platform area of the stairs. Polygons 615 correspond to the handrail, and polygons 620 correspond to noise. In some cases, the scanning operation may generate some noisy data (i.e. data that may not accurately reflect an object). The noisy data is visualized by polygons 620.

It should be noted that in its current form, detailed SR mesh 600 constitutes a single mesh compilation. That is, the stair polygons 605, the platform polygons 610, the handrail polygons 615, and the noise polygons 620 are all compiled into a single comprehensive mesh. As described earlier, managing such a large mesh is often overly time consuming and requires a significant amount of computing resources. Therefore, it is desirable to simplify how the SR data is managed.

Returning to FIG. 5, either in parallel with act 510 or subsequent to act 510, there is another act (act 515) of using the SR data to infer a high-level 3D structural representation (e.g., inferred structure mesh 435) of the environment. This high-level 3D structural representation is inferred using machine learning that is performed on the surface reconstruction data to identify a structure of the environment. The inference can additionally be performed using computer vision, as described earlier.

Figure 7:
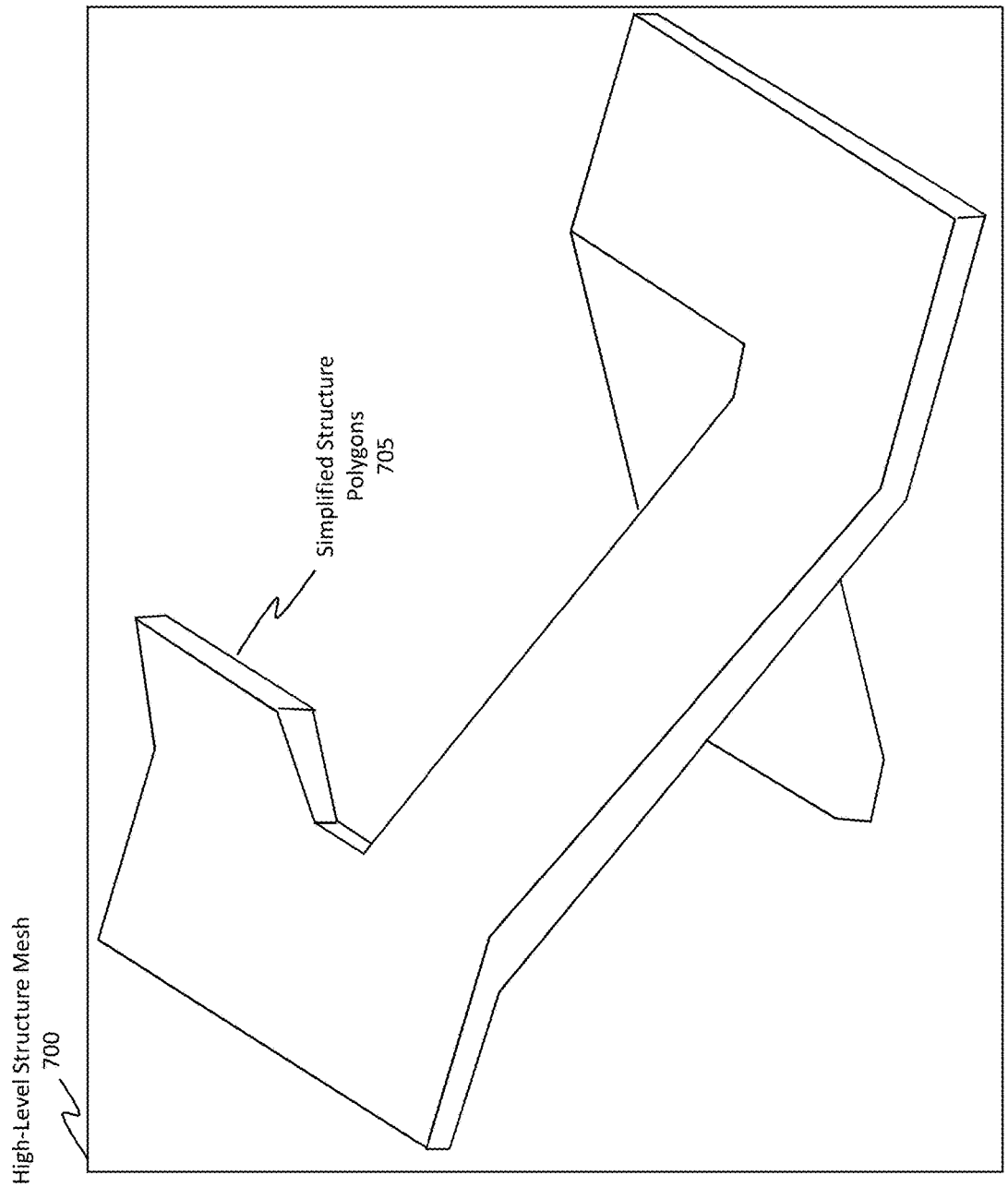
FIG. 7 illustrates how a high-level structure mesh may also be generated from the depth scanning data. Here, machine learning is used to identify structural features of the environment (e.g., floors, walls, ceilings, large planar or other geometric surfaces, etc.), and those structural features are included within the high-level structure mesh.

Turning briefly to FIG. 7, this figure illustrates an example of a high-level structure mesh 700 that may be used as the "high-level 3D structural representation" mentioned in method act 515. Notably, because the scanning data was based on a stairway environment, the remaining figures will continue with that example.

High-level structure mesh 700 is comprised of a number of simplified structure polygons 705 (e.g., 3D triangles). These simplified structure polygons 705 generally represent the structural features related to the stairway. Notice, specific details regarding the steps have been omitted, or rather, the specific details of the steps were not included in the high-level structure mesh 700. Rather than including specific details (as in the detailed SR mesh 600 from FIG. 6), the high-level structure mesh 700 includes only simplified representations of the structural features. It should be noted how both the detailed 3D representation and the high-level 3D structural representation are comprised of SR polygons (e.g., 3D triangles) used to represent the environment three-dimensionally.

In some cases, the structural features are represented as simplified planar regions or other simplified geometric shapes. To be classified as structure (and to be represented as planar regions and geometric shapes), the characteristics of any candidate structural objects will be required to satisfy certain structure definition parameters, as will be discussed momentarily.

Although FIG. 7 illustrates only the simplified representation of the stairway, one will appreciate that other structural representations can also be included in the high-level structure mesh 700. For instance, walls, floors, ceilings, load-bearing surfaces, and so forth can and will have corresponding simplified representations included in the high-level structure mesh 700.

It is also worthwhile to note that the number of polygons (e.g., 3D triangles) included in the simplified structure polygons 705 will be substantially less than the number of polygons included in the detailed SR mesh 600 (e.g., the difference in numbers will often be orders of magnitude apart). By way of a specific non-limiting example, the detailed SR mesh 600 may include over 150,000 polygons whereas the high-level structure mesh 700 may include less than 5,000 polygons. Of course, these are example numbers only and should not be used to limit the disclosure.

Figure 8:
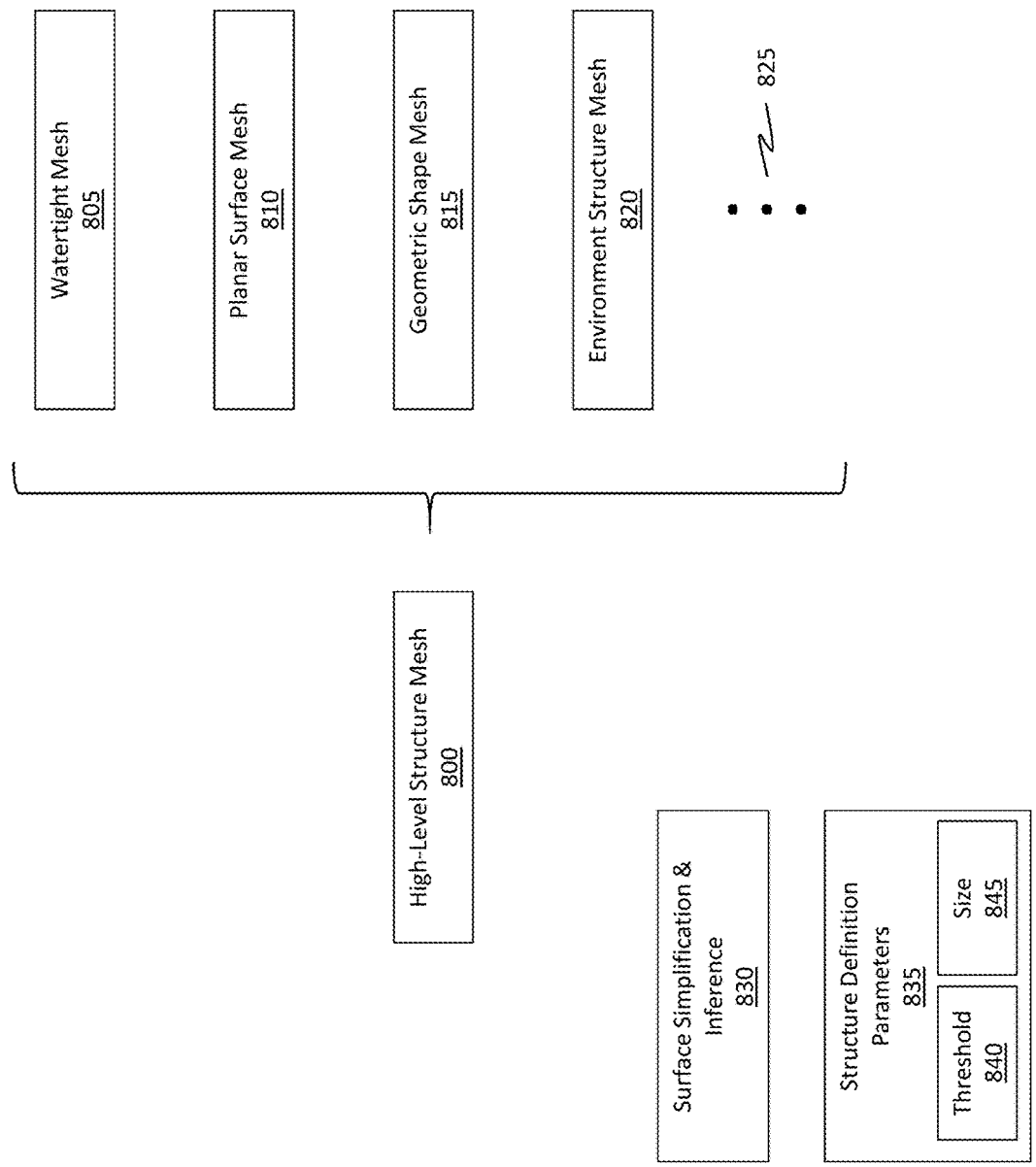
FIG. 8 illustrates additional features that may be included or associated with the high-level structure mesh.

FIG. 8 provides additional detail regarding a high-level 3D structural representation (i.e. high-level structure mesh 800), which is representative of the high-level structure mesh 700 of FIG. 7. As shown, high-level structure mesh 800 may include any number of different mesh constructs. For example, high-level structure mesh 800 may include a watertight mesh 805.

As used herein, watertight mesh 805 refers to a volumetric mesh construct consisting of fully closed or interconnected surfaces, where the combination of these surfaces causes the volume to be "watertight" (i.e. if the mesh where symbolically filled with water, no water would leak out because the surfaces are entirely connected without any openings). In this regard, watertight meshes can be considered as not having holes in their surfaces. With reference to FIG. 7, for the high-level structure mesh 700 to be considered "watertight," then the high-level structure mesh 700 would need to additionally include simplified representations of surrounding walls, floors, and ceilings, so as to entirely contain the structural volume of the mesh. One will appreciate that the use of a watertight mesh is but one of many different types of meshes that may be used. As such, unless otherwise specified or recited in the claims, the embodiments should not be limited to any specific type of mesh.

Returning to FIG. 8, the high-level structure mesh 800 is also shown as including a planar surface mesh 810. The planar surface mesh 810 can be configured to include planes corresponding to structural features of the environment. With reference to FIG. 7, what was previously depicted as being stairs is now shown as being more like a ramp-like plane. The ramp-like plane is a planar region symbolically representing the underlying structure of the stairway.

That is, specific details for each individual stair are not required to symbolize the structure of the stairway. As such, those details can be omitted from the high-level structure mesh 800. As described earlier with regard to windows, the planes included in the planar surface mesh 810 can overcome, swallow, encompass, or rather simplify any type of structural object so that the structural object is now depicted in a more simplified form (e.g., simply as a plane).

Relatedly, high-level structure mesh 800 can include a geometric shape mesh 815 in which any type of geometric shape (not just planes) can be used to represent structure of an environment. Any type of shape may be used, including squares, circles, rectangles, triangles, polygons, parallelograms, cylinders, spheres, pyramids, cones, tori, cubes, cuboids, triangular pyramids, square pyramids, triangular prisms or other types of prisms, and so forth. Indeed, any geometric shape may be used to represent an environment's structure.

Environment structure mesh 820 is illustrated to capture any other feature that may be considered, classified, or inferred as being a structural feature of an environment. Similarly, the ellipsis 825 demonstrates how any other mesh type may be used to identify an environment's structure. As mentioned earlier, any type of machine learning and computer vision may be used to identify or infer structural features of an environment and include those features in the high-level structure mesh 800.

In this regard, the machine learning is able to perform an operation of surface simplification and inference 830. Using the stairway as an example, each individual stair is not required to represent the structure of the stairwell. Instead, a simplified planar ramp can be used to represent the structure of the stairway. As such, the machine learning algorithm can infer structure from a complex set of SR data (e.g., the complex data corresponding to each individual stair) and can simplify that complex set of SR data into simplified (or high-level) structural information (e.g., the stairs are simplified into a planar ramp).

By inferring structure and simplifying complex SR data representations, the number of representative polygons within the high-level structure mesh 800 will be significantly less than the number of polygons in the detailed SR mesh. For instance, because the high-level structure mesh 800 would represent the structure of a set of stairs simply as a planar ramp, the number of polygons in the planar ramp will be significantly less than the number of polygons required to represent each step of a stairway.

Of course, the high-level structure mesh 800 may include any one or combination of the different mesh types just mentioned, without limitation. By performing the surface simplification and inference 830, the embodiments are able to reduce the amount of detail required for structural features.

It should also be noted that sometimes the scanning operation may be incomplete such that holes are present in the resulting detailed SR mesh or the volumetric data structure. In accordance with the disclosed principles, when the high-level structure mesh 800 is generated, this mesh can effectively fill in any holes that may have been present for structural features of the environment.

By way of example, it may be the case that one of the walls was not scanned sufficiently such that the resulting detailed SR mesh has a hole for that wall. The embodiments are able to identify the wall as being a structural feature and, notwithstanding the hole in the detailed SR mesh, generate a complete mesh for the wall by filling in the holes using inferences (e.g., by connecting the wall portions to form a single complete wall devoid of holes). As such, the embodiments are able to rectify structural object deficiencies, which may initially be included within a detailed SR mesh, when generating the high-level structure mesh 800 by effectively extending regions to fill in existing holes.

FIG. 8 also shows how a set of structure definition parameters 835 may be used when determining or inferring structure. For example, machine learning can be used to identify the structure of the environment, and the machine learning can use the structure definition parameters 835 to determine which environmental features constitute structural of the environment.

Some examples of these parameters include, but are not limited to, whether the candidate object or candidate SR data (i.e. the object under consideration as to whether it is to be inferred or classified as being "structure") is load bearing (e.g., a wall is able to bear a load, likewise a floor is able to bear a load, likewise a ceiling is able to bear a load, and so on). Another example is whether the candidate object encapsulates or envelopes other objects in the environment. By way of example, the body of a vehicle is likely to be considered structure because it envelopes or surrounds numerous other internal objects.

Another example can be whether the candidate object has a sufficiently large surface area. By way of example, in some embodiments, a table may be considered as a structural feature for the environment.

To illustrate, a conference room may include a large table covering a majority of the floor space. In such a scenario, the machine learning algorithm may determine that because the table occupies such a large space (i.e. the table size satisfies a particular size threshold), then the table should be included among the other structural features of the conference room.

In contrast, a chair positioned next to the table will likely not be considered as structure, even though the chair may have a planar seat region. Generally, then, the structure of the environment can include planar or other geometric regions having a size that satisfies a size threshold.

As an example, surfaces that are at least 25 centimeters (cm) by 25 cm may satisfy the threshold requirement. Of course, other size dimensions may be used (e.g., 20 cm, 21 cm, 22 cm, 23 cm, 24 cm, 25 cm, 26 cm, 27 cm, 28 cm, 29 cm, 30 cm, 40 cm, 50 cm, 60 cm, 70 cm, 80 cm, 90 cm, 100 cm, or more than 100 cm).

Relatedly, the size requirement may be a polygon or triangle number requirement. For instance, the object's representation may be required to have a certain number of triangles in order to be identified as being a structural feature. This polygon requirement may be a maximum number of polygons or a minimum number of polygons. For example, the requirement may be set so that in order to be classified as a structural feature, the object must be represented by fewer than 10 triangles (or any other predetermined value). In some cases, the requirement may be a combination of the surface area size as well as the number of triangles.

In this regard, the embodiments may rely on different thresholds 840 when selecting which objects are to be inferred or classified as being structural. In some embodiments, threshold 840 include a size 845 requirement (e.g., the surface area of the object may be required to be of a particular size in order to be classified as structural or the volume of the object may be required to be of a particular volume).

Threshold 840 may include a mobility requirement. For example, the object may be required to be immobile or identified as being an object that seldom moves, moves less than a threshold amount, or is classified as an object whose mobility characteristics are within a predetermined threshold. In some cases, the embodiments are able to prompt a user to ask him/her whether a candidate object should be classified as being structural. Based on the user's feedback, the machine learning can continue to learn and adapt for future or subsequent inferences.

Figure 9:
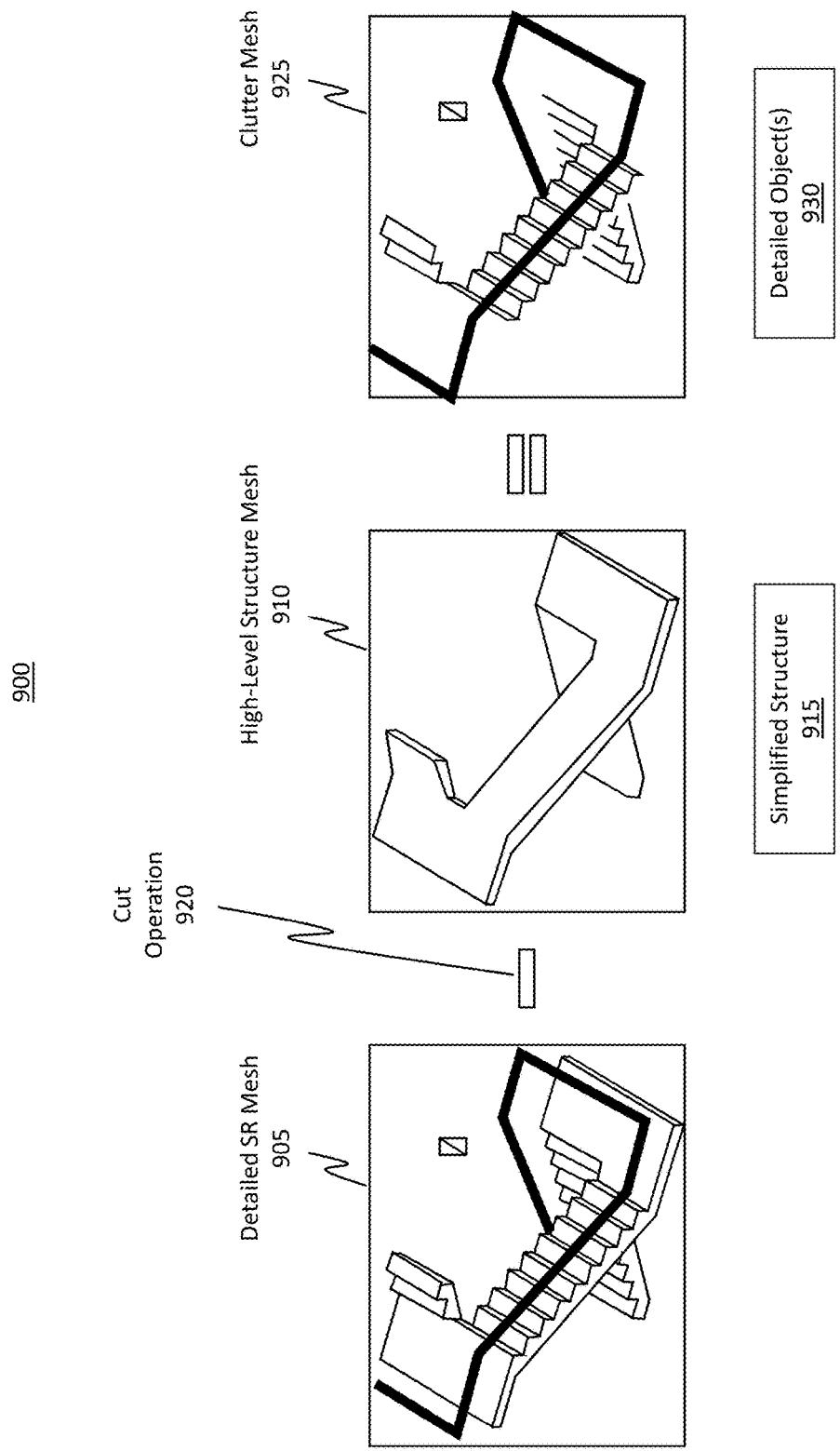
FIG. 9 illustrates an example process in which the high-level structure mesh is cut, extracted, pulled, or otherwise removed from the detailed SR mesh to thereby generate a clutter mesh comprising "left-over" or "remaining" objects that are non-structural in nature.

Returning to FIG. 5, the high-level 3D structural representation is then cut (act 520) from the detailed 3D representation. This cutting operation generates a clutter mesh comprising objects that remain after the cut and that are distinct from the structure (e.g., because the structure was cut away from the detailed 3D representation, non-structural features are left behind). FIG. 9 is illustrative of this cutting operation.

Of note and as described earlier, the cutting operation is not actually a delete operation; rather, it refers to an omission operation in which the cut data is prevented from being included in the resulting clutter mesh. Similarly, the cut operation can be performed on the detailed 3D mesh or, alternatively, it can be performed on the volumetric data structure mentioned earlier, with both operations arriving at the same resulting clutter mesh.

As indicated above, in some embodiments, the cut operation can be an exclusion operation in which certain data is excluded from being included in the resulting "clutter mesh." In some embodiments, the cut operation also includes a clustering operation in which data (e.g., from the detailed 3D representation) is selectively grouped together to form clutter "meshes" or perhaps clutter "objects" that are included as parts of the clutter mesh. In this regard, the embodiments are not only able to cut data from the detailed 3D representation, but they are also able to decompose instance segmentation via semantic clustering. Accordingly, use of the term "cut" should be interpreted broadly to include operations such as extraction, grouping, separating, segmenting, clustering, deleting, and removing.

Specifically, FIG. 9 shows a process 900 involving a detailed SR mesh 905, which is representative of the detailed SR meshes discussed thus far, and a high-level structure mesh 910, which is representative of the high-level structure meshes discussed thus far. As shown, high-level structure mesh 910 illustrates structural objects in simplified forms, as represented by simplified structure 915. That is, the high-level structure mesh represents the structure of the environment without all of the detailed objects and in simplified form.

In accordance with method act 520, the high-level structure mesh 910 is cut (e.g., see cut operation 920) from the detailed SR mesh 905. To clarify, the areas represented by the polygons in the high-level structure mesh 910 are removed, extracted, filtered, or otherwise cut from the corresponding areas in the detailed SR mesh 905. Because the detailed SR mesh 905 and the high-level structure mesh 910 are based on the same volumetric data structure (e.g., volumetric data structure 425 from FIG. 4), the two meshes are spatially aligned and thus the cutting operation will be able to accurately and in a directed/pinpointed manner remove the structural features from the detailed SR mesh 905.

FIG. 9 shows the results of the cutting operation 920. Specifically, the cutting operation 920 generates a new mesh referred to herein as a clutter mesh 925, which may actually be a collection of multiple discrete clutter object meshes. As shown, the structural features that were originally included in the detailed SR mesh 905 have been removed, leaving behind "clutter" or "detailed" object(s) 930. These clutter objects are represented in detail by the clutter mesh 925 (i.e. they are represented by detailed polygons) but without being supported by any structure. Notably, the size of the clutter mesh 925 will be significantly smaller than the size of the detailed SR mesh 905 because of the removal of the structure.

The polygons (e.g., 3D triangles) that are leftover/remaining in the clutter mesh 925 correspond to actual objects included within the environment. Numerous different operations can then be performed on the remaining polygons included in the clutter mesh, as will be described shortly. In this regard, the high-level 3D structural representation (e.g., high-level structure mesh 910) may include different types of geometric shapes (e.g., including a plane, cylinder, and so forth), and the cut operation 920 may involve or include cutting the high-level 3D structural representation from the detailed 3D representation (e.g., the detailed SR mesh 905) in a manner so that the geometric shapes are cut from the detailed 3D representation.

Figure 10:
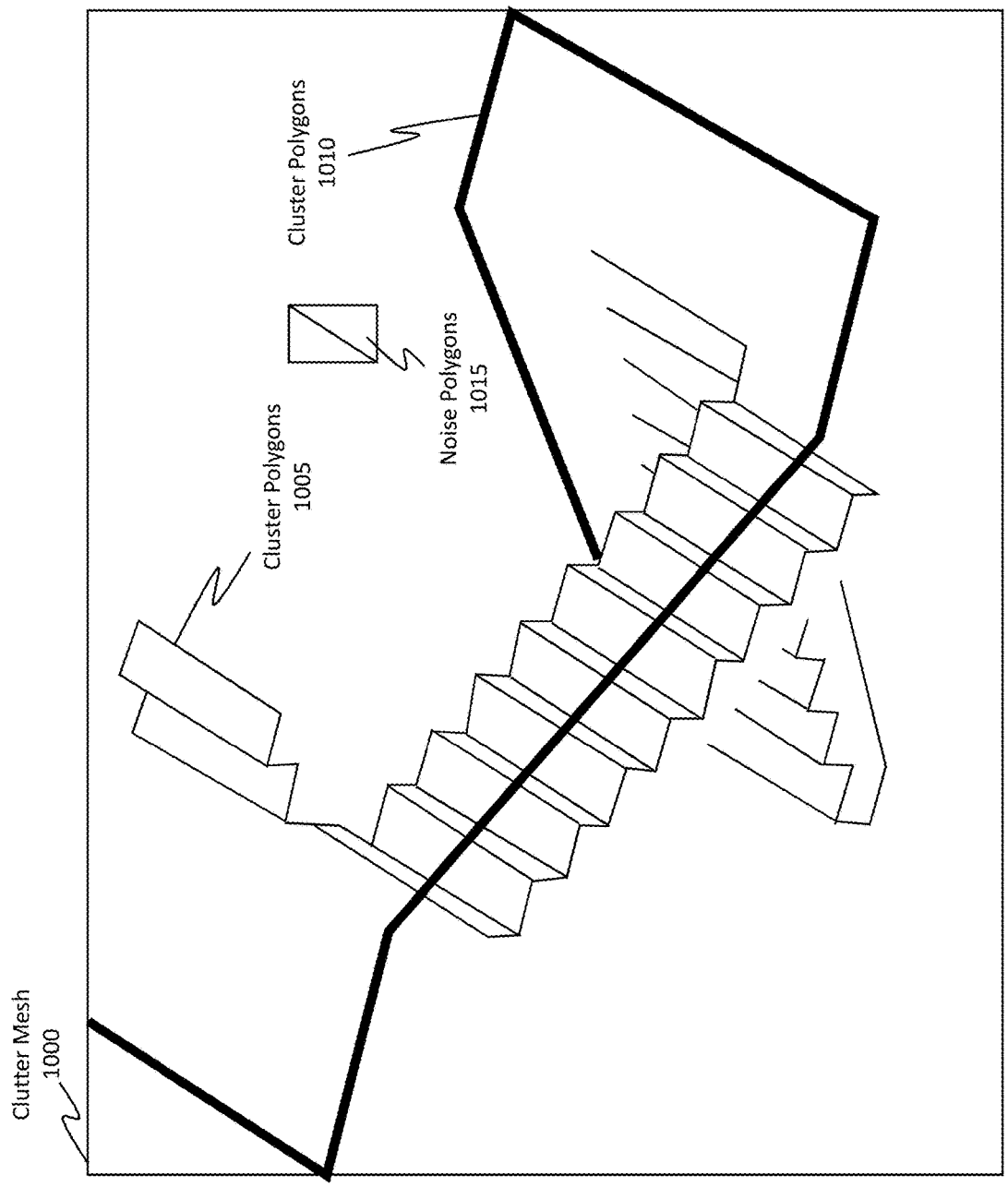
FIG. 10 illustrates a more detailed view of an example clutter mesh.

FIG. 10 illustrates a more detailed view of a clutter mesh 1000, which is representative of the clutter mesh 925 from FIG. 9. Clutter mesh 1000 is shown as including different sets of polygons, including cluster polygons 1005 (e.g., corresponding to the stairs), cluster polygons 1010 (e.g., corresponding to the handrail), and noise polygons 1015.

Figure 11:
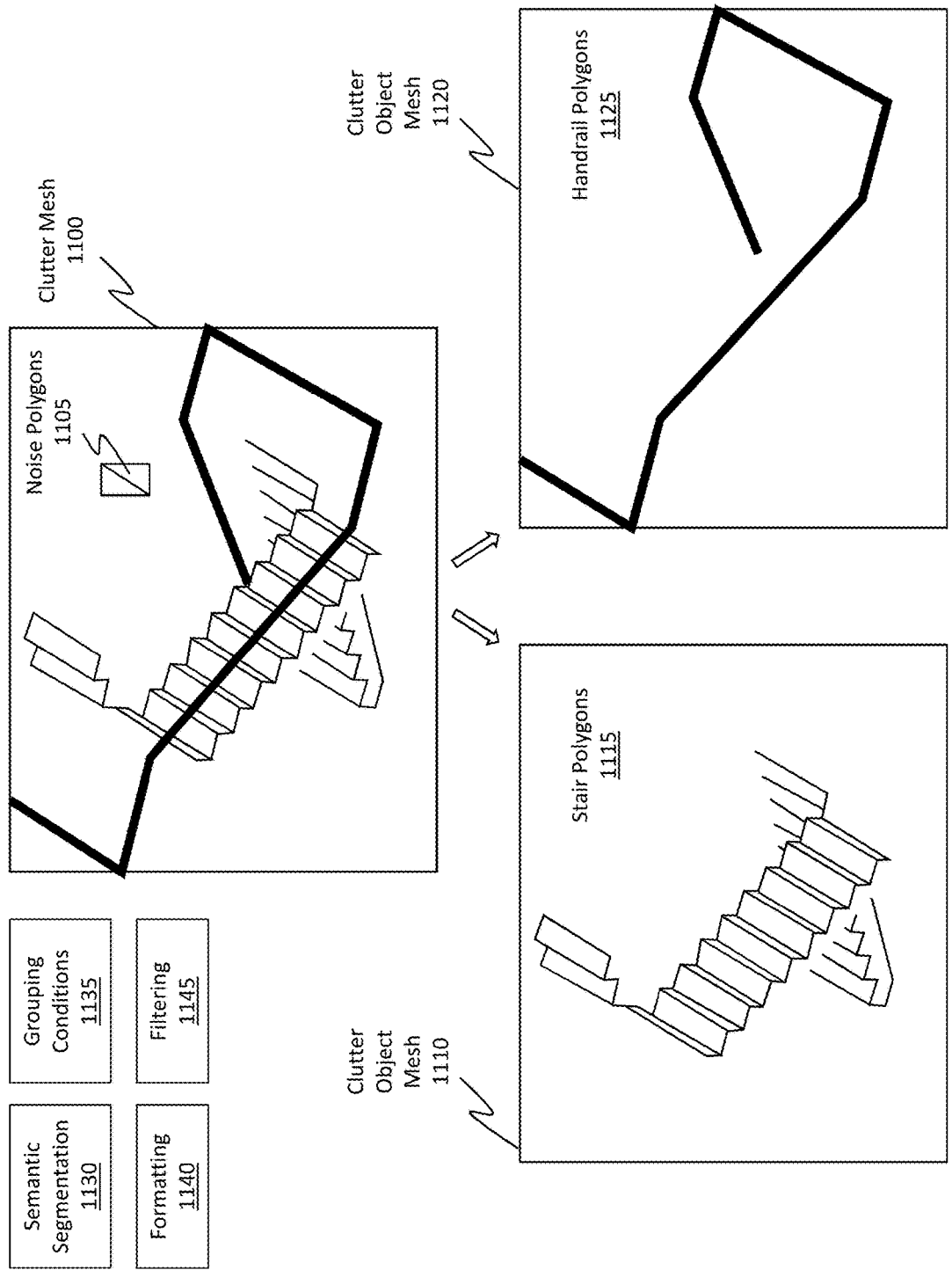
FIG. 11 illustrates how objects included within the clutter mesh can be identified by grouping or clustering different SR data (e.g., polygons or 3D triangles) together and how those objects can be semantically segmented.

Returning to FIG. 5, semantic segmentation (aka object segmentation or object recognition) is then performed (act 525) on the remaining objects in the clutter mesh to identify those objects. This semantic segmentation may occur by analyzing each individual pixel, polygon, or unit of SR data to classify it as belonging to a particular object. For example, polygons that represent a stairway handrail would be grouped or clustered together to digitally represent that handrail. FIG. 11 is illustrative of such an operation.

Specifically, FIG. 11 shows an initial clutter mesh 1100, which is representative of the clutter meshes discussed thus far. Clutter mesh 1100 is specifically shown as including noise polygons 1105.

By performing semantic segmentation on the polygons included in the clutter mesh 1100, the embodiments are able to group/cluster and classify polygons so that the groups correlate or correspond to specific and distinct objects located in the environment. Additionally, as a result of the cutting operation and/or the semantic segmentation, each resulting object represented within the clutter mesh 1100 will have its own distinct mesh, which is separate from the meshes for any of the other clutter objects.

To illustrate, FIG. 11 shows a first clutter object mesh 1110, which includes stair polygons 1115 that have been grouped/clustered together to represent only the stairs. Similarly, FIG. 11 shows a second and distinct clutter object mesh 1120, which includes handrail polygons 1125 that have been grouped/clustered together to represent only the handrail.

In this regard, the embodiments are able to perform semantic segmentation 1130 to group/cluster, identify, or classify different polygons as belonging or being associated with different objects. The cutting operation and/or the semantic segmentation causes distinct SR meshes to be formed or generated for each one of the clutter objects. That is, each object included in the remaining objects of the clutter mesh is associated with a distinct corresponding 3D representation as a result of the cut.

As a part of the semantic segmentation 1130, the embodiments are able to use or rely on any number of predetermined grouping conditions 1135 when determining how to group/cluster polygons together to represent (three dimensionally) an object. These grouping conditions 1135 include, but are not limited to, a proximity requirement (i.e. polygons/data items that are to be grouped/clustered together may be required to be within a determined proximity or threshold distance to one another or to at least one other polygon/data item).

The grouping conditions 1135 may include a statistical property variance requirement (i.e. the spread between polygons/data items in a candidate set of polygons) or a model fitting requirement (i.e. does the polygon conform to a model that is being matched or compared against a grouping of polygons). For instance, a handrail model may be compared against a group of polygons to determine whether the shape, arrangement, and orientation of those polygons conforms to the model.

The grouping conditions 1135 may include an instance requirement. For example, the instance requirement may require certain instance segmentation, which occurs by identifying each object instance for each pixel for each object in the environment. Of course, any additional grouping condition may be considered.

Accordingly, the process of cutting and/or semantic segmentation may include grouping specific SR data together to represent a specific object included in the remaining objects that remain from the cut. This grouping can, therefore, be performed based on a selected set of grouping conditions that are required to be satisfied for the specific SR data to be grouped together.

In some embodiments, even though each object may have its own corresponding mesh, a collection of multiple different meshes may be visually displayed with one another. By way of example, the clutter mesh 1100 visually illustrates the clutter object mesh 1110 with the clutter object mesh 1120. In scenarios in which multiple different clutter meshes are displayed simultaneously with one another (and in some cases, one mesh may overlap or occlude another mesh), different formatting 1140 may be applied to each mesh. That is, each 3D representation or SR mesh for each remaining clutter object can be configurable for display and, when displayed, can be displayed with a corresponding display format.

This formatting 1140 may include, without limitation, differences in how the meshes are visually displayed through the use of different highlighting, coloring, transparency or occlusion properties, boldness, blinking characteristics, and so forth. In some cases, when a mouse or other pointing object hovers over a mesh, then additional descriptive material about the mesh may be displayed. For example, the object's classification can be displayed (e.g., a label for the handrail can be displayed listing "handrail" as the description or classification). Additionally, depth attributes or properties about the object may be displayed (e.g., a label can be displayed indicating how far the handrail is relative to another object or even relative to a current user). Any other descriptive information can also be displayed.

In some cases, the embodiments will perform filtering 1145 to remove noisy polygons (i.e. polygons that are not identified as being associated with specific objects but that were generated due to inaccuracies in the scanning operation), such as noise polygons 1105. As a part of the semantic segmentation 1130, the embodiments may determine that noise polygons 1105 are not actually associated with any specific object. In such a case, the embodiments can then filter those polygons out so that they are no longer included in any clutter mesh 1100. In this regard, the cutting process may include filtering out at least some remaining SR data included in the clutter meshes, where this remaining SR data is filtered as a result of it failing to satisfy the previously described selected set of grouping conditions (i.e. this data may not have been identified as corresponding to any object within the environment).

By performing the method described in FIG. 5, the embodiments are able to improve how SR meshes are generated and are able to improve how objects are identified. Furthermore, instead of having to include all representative polygons within a single composite SR mesh, the embodiments (as a result of the cutting operation) are able to generate a unique and individual SR mesh for each object. In some cases, each SR mesh can be considered or can constitute a separate layer that may be added or included in a collection of clutter meshes. The embodiments provide options for selectively adding or removing the different layers from the collection of clutter meshes and for selectively providing any number of layers to a client or application for processing, as will be described in more detail later.

Improving Mesh Accuracy

Figure 12A:
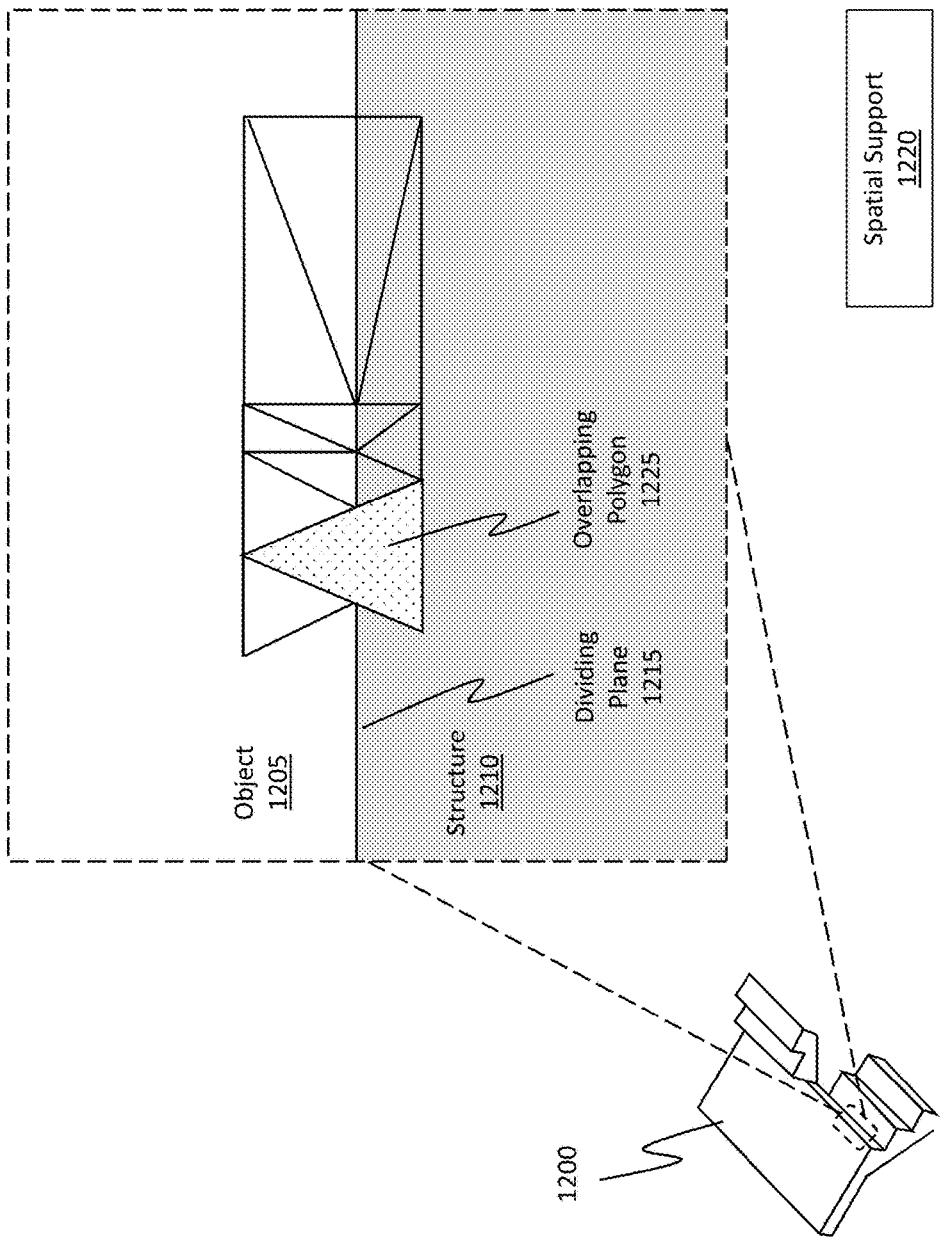
FIG. 12A illustrates how, in some instances, some SR data (e.g., a polygon or a 3D triangle) may be associated with multiple different objects (i.e. multiple different objects share the same spatial support or the same 3D triangle) such that the SR data overlaps with different features of the environment.
Figure 12B:
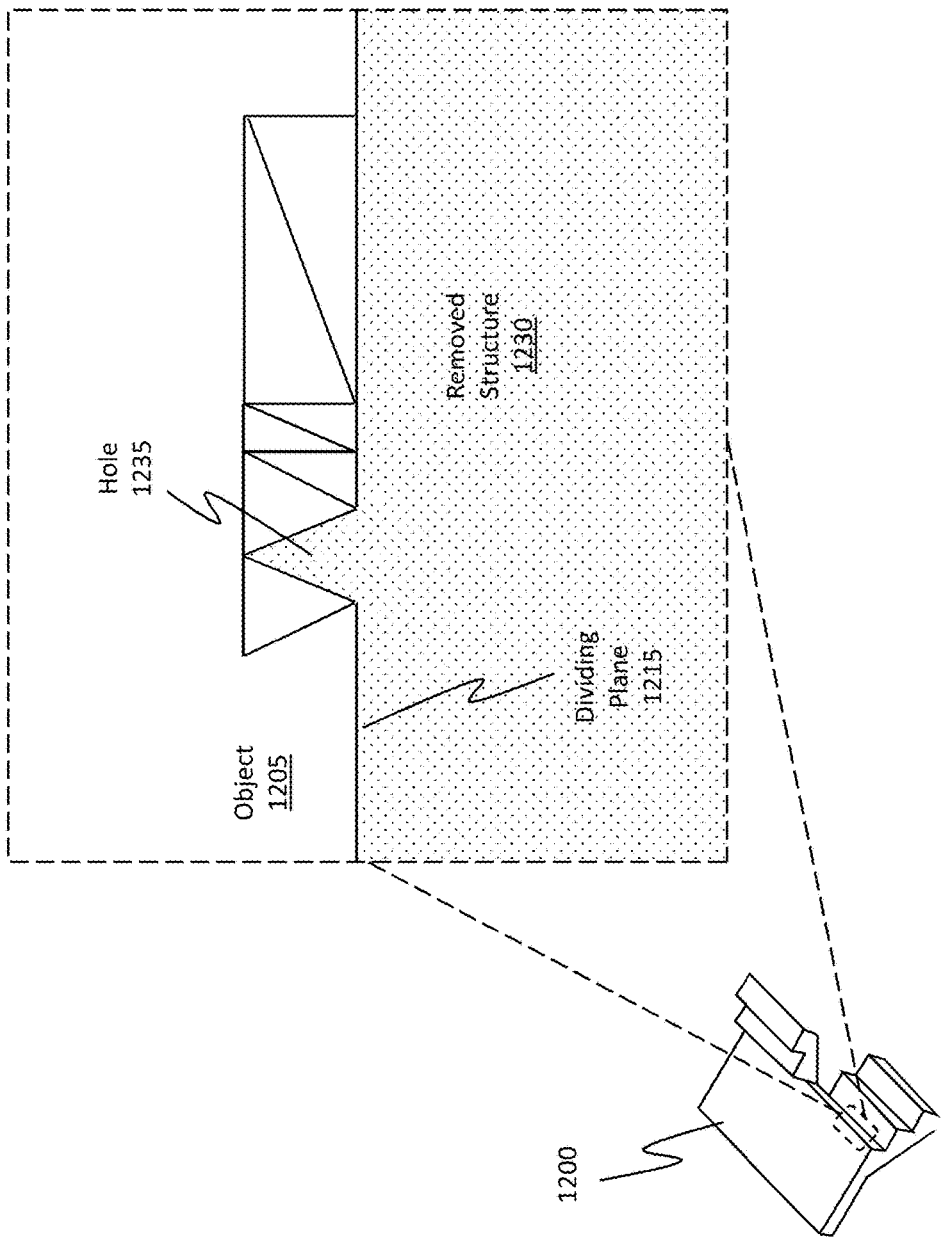
FIG. 12B illustrates how a mesh cutting operation sometimes results in inaccurate edges being formed on an object's resulting SR mesh, where the inaccurate edges occur because the overlapping SR data is cut from the object's SR mesh and forms a jagged edge.
Figure 12C:
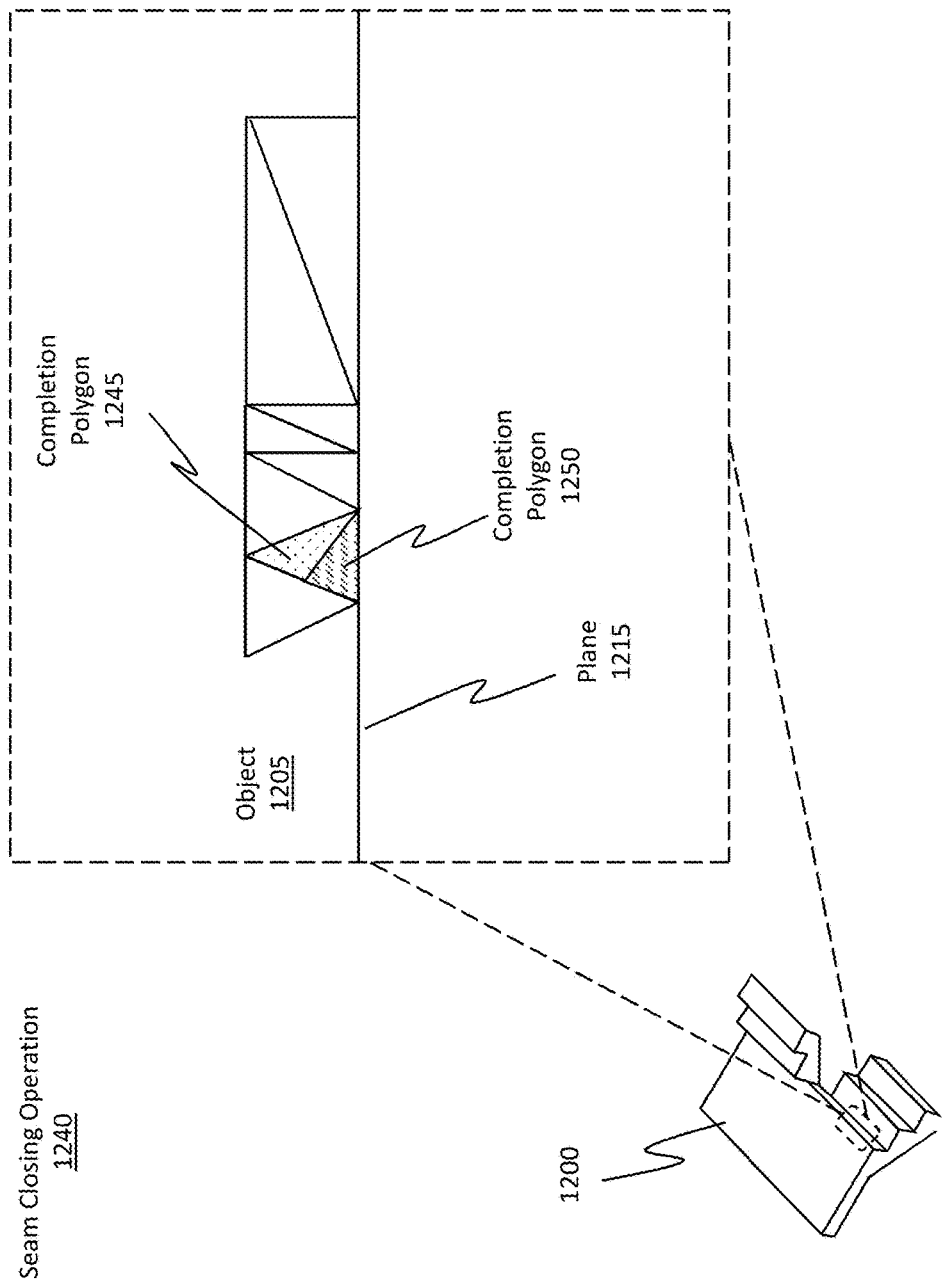
FIG. 12C illustrates an example seam closing completion operation in which jagged edges of an object's SR mesh can be closed, filled, or otherwise completed to improve the accuracy of the object's SR mesh, especially around the border regions of the object's representation.

In some cases, the cutting operation may cause skewing or imperfections in the resulting SR clutter meshes. FIGS. 12A through 12C illustrate an example completion operation that can be performed in order to resolve or rectify such imperfections.

Turning first to FIG. 12A, there is shown a detailed SR mesh 1200, which is representative of the detailed SR mesh 600 of FIG. 6. Similar to the earlier examples, this detailed SR mesh 1200 is representative of a stairwell.

FIG. 12A specifically illustrates one portion of the detailed SR mesh 600, this portion corresponds to the area representing the platform landing of the stairwell as well as one of the steps. In particular, object 1205 is representative of the step while structure 1210 is representative of the platform landing. Based on the earlier discussion, it was determined that the platform landing is to be classified as a structural feature while the details of the specific step will be included in a resulting clutter mesh.

There is a dividing plane 1215 separating the object 1205 from the structure 1210. Although the dividing plane 1215 is illustrated as a straight line, dividing plane 1215 need not be a straight line. Rather, any geometric shape may be used to separate different objects. As such, the dividing plane 1215 is simply provided for example purposes only and should not be construed as limiting the disclosure.

As discussed throughout this disclosure, the detailed SR mesh 1200 includes any number of polygons, as shown by the different 3D triangles in FIG. 12A. While only 13 triangles are illustrated, any number of triangles may be present. Furthermore, large areas of the object 1205 and the structure 1210 are not illustrated as having polygons simply to keep the figures from being overly complex.

FIG. 12A also shows an overlapping polygon 1225 (overlapping 3D triangle). In some cases, the scanning operation performed by the scanning sensors may not generate detailed areas for some of the seam regions between different objects. In such cases, there may arise a condition in which multiple objects share the same spatial support 1220. To clarify, FIG. 12A shows how object 1205 and structure 1210 share the same spatial support 1220 because the overlapping polygon 1225 is at least partially overlapping or extending into both object 1205 and structure 1210.

FIG. 12B shows a result of what may occur when the disclosed cutting operation is performed. That is, as described earlier, during the cutting operation, the structural features are cut from the detailed SR mesh, leaving behind non-structural objects in the cluster mesh.

FIG. 12B shows how the resulting clutter mesh (after the cutting operation) includes polygons related to the object 1205. FIG. 12B also shows removed structure 1230, which represents how the structural features have been removed as a result of the cut.

Because the overlapping polygon 1225 in FIG. 12A overlapped both the object 1205 and the structure 1210, the cutting operation removed the overlapping polygon 1225, leaving a hole 1235 in the object 1205 at the seam between the object 1205 and what used to be the structure 1210. This hole 1235 causes the object 1205's seam or boundary to have an imprecise, jagged, or otherwise inaccurate contour/edge/boundary. Such an imprecise edge, boundary, or contour is often undesirable and may cause rendered holograms dependent on object 1205 to be skewed in some manner, especially if those holograms are dependent or locked onto that specific skewed area of object 1205.

Therefore, in accordance with at least some of the disclosed principles, the embodiments are able to perform a so-called seam closing operation 1240, which is shown in FIG. 12C. Specifically, the embodiments are able to identify the hole 1235 in the object 1205's boundary or edge.

This identification process may be performed by matching or comparing the object 1205 to a model to identify the object's type and its associated attributes. As a part of this comparison process, the embodiments are able to use similar models identify the geometries, shapes, and contours of the object and to identify the hole 1235. In some embodiments, this identification process can also be performed by tracing the outer bounds of the object 1205 and identifying unsmooth, nonuniform, or jagged areas.

To be classified as unsmooth, nonuniform, or jagged, some embodiments identify areas whose shapes have changed beyond a selected threshold value. With reference to FIG. 12B, if the embodiments were to trace the outer bounds of object 1205, the embodiments would initially follow a generally straight line up until the hole 1235 is reached. Upon reaching that hole 1235, the tracing operation would then shift direction and follow a V-shape and then return to a generally straight line.

Here, the variance between the shape of the hole 1235 and the surrounding areas may be beyond or may surpass a variance threshold. As a consequence, the embodiments can identify the area corresponding to hole 1235 as an area in which the seam closing operation 1240 should be performed.

To perform the seam closing operation 1240 (i.e. a completion operation), the embodiments fill in the hole (e.g., hole 1235) with polygons. This filling-in process can be performed by altering existing polygons to fill in the hole area or it can be performed by adding new polygons into the area.

FIG. 12C specifically shows how two new polygons (i.e. completion polygon 1245 and completion polygon 1250) are added into the clutter mesh for object 1205 to fill in the previous hole 1235. When adding polygons, any number of polygons may be added in order to fill up the hole. Similarly, when distorting or modifying existing polygons to fill in the hole, any number of existing polygons may be modified.

This seam closing operation 1240 may be performed any number of times and for any number of holes that may occur as a result of the cutting operation. In some cases, when existing polygons are modified to fill in a hole, those modifications may cause additional alterations at other boundary edges of the object 1205. As a consequence, the seam closing operation 1240 can be performed at those other areas to fix or fill them in. The process of filling in the hole can be performed to ensure that a variance between the surrounding regions of the hole and the now-filled-in hole satisfies a particular variance threshold in order to smooth out the seam. Of course, this seam closing operation 1240 may be performed for any number of clutter objects. By so doing, the embodiments are able to improve the accuracy of the resulting SR meshes for each individual clutter object.

Additional Cutting Techniques

Figure 13:
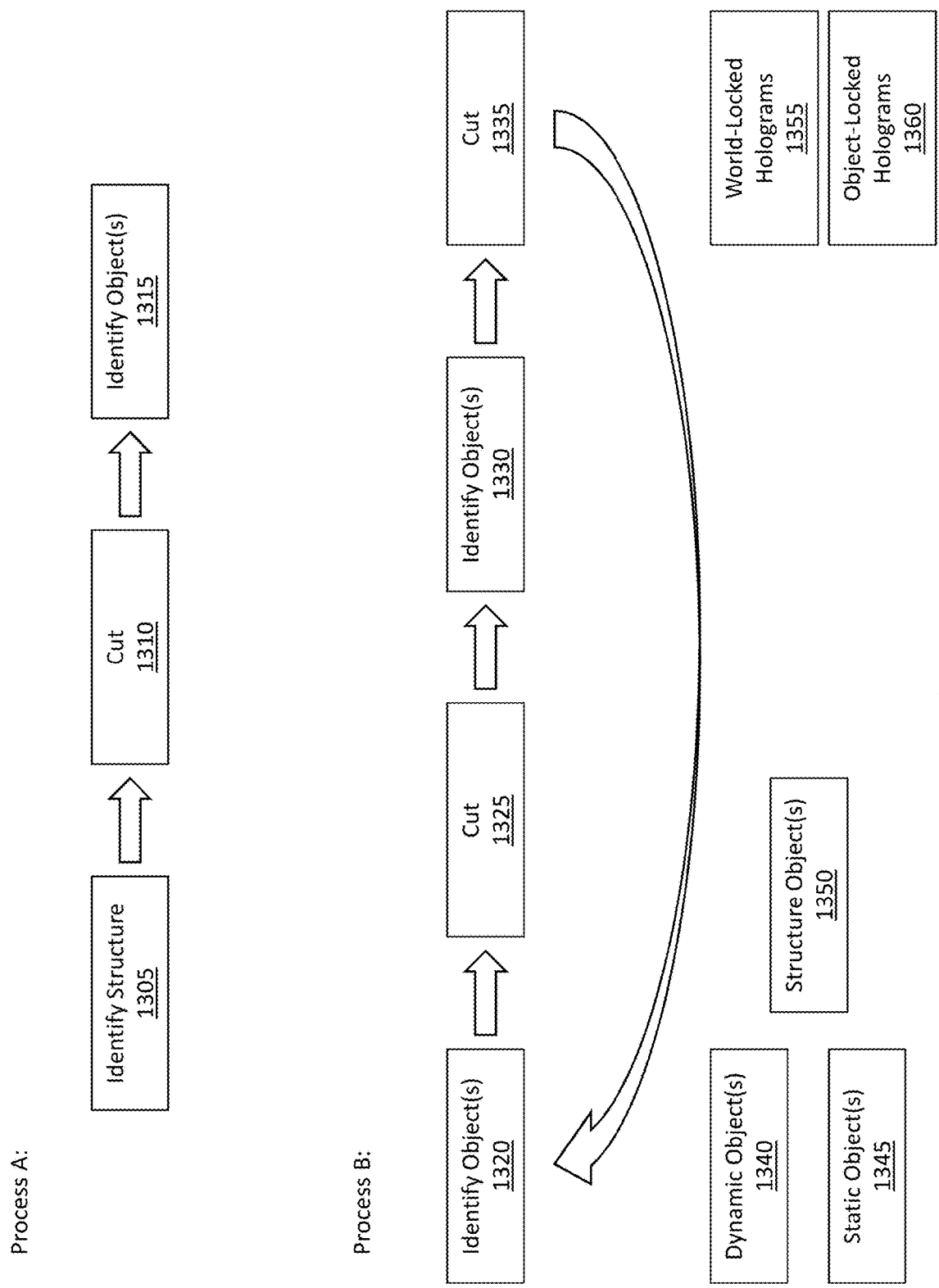
FIG. 13 illustrates different techniques for performing the cutting operation.

FIG. 13 illustrates two example processes (Process A and Process B) that may be performed as a part of the cutting operation. Process A generally relates to the disclosure that has been presented thus far. For instance, in Process A, there is a step of identifying structure (1305), cutting the structure from a detailed SR mesh (1310), and then identifying and categorizing the clutter objects that remain in the resulting clutter mesh (1315).

Process B, on the other hand, illustrates an incrementally repetitive operation that may be performed. Initially, any number or type of objects (including structural features and/or non-structural features) may be identified (1320) from a detailed SR mesh. These identified objects can then be cut from the detailed SR mesh (1325) and included within their own corresponding SR mesh. Then, there is another step of identifying more objects from within the detailed SR mesh (1330), which now may no longer be as detailed as it once was. These objects can then be cut (1335) as described above. The process can repeat any number of times as desired (e.g., until all of the objects in the detailed SR mesh are identified).

Either during this process or at its completion, the embodiments are able to analyze each cut object to determine whether it corresponds to a structural feature. Structural features can then be included within a high-level structure mesh. As a consequence, instead of building the high-level structure mesh all at once (as in Process A), Process B presents an incremental process in which the high-level structure mesh is built over time and in which the individual discrete object meshes are also built over time.

In some embodiments, after a high-level structure mesh is initially generated, the mesh can be further analyzed to identify areas that can be simplified even further. For instance, during the initial generation of the high-level structure mesh, a planar region may have been represented using a certain number of polygons. Upon a subsequent review of that planar region, however, it may be determined that the representation of the planar region can be further simplified by using a fewer number of polygons. As such, the embodiments are able to repeatedly analyze the high-level structure mesh in an effort to maximize or at least increase its simplicity.

As a part of the identification and cutting process, the embodiments are able to identify dynamic object(s) 1340 (e.g., moving objects), static object(s) 1345 (e.g., non-moving objects), and structure object(s) 1350. In some cases, the embodiments will be scanning while a dynamic moving object is present in the environment. When this occurs, then the scanning data may include data having a "ghosting" effect in which the dynamic object is moving during the capture.

The embodiments are able to identify these ghosting effects and associate them with the dynamic object. That is, when the cutting operation is performed, the ghosting data can also be associated with the dynamic object. Such an operation is beneficial for simulation purposes.

By way of example, suppose an HMD captures a person walking down a set of stairs. The movements of the person may be captured during the scanning operation. These movements may appear as a ghosting or skewed effect within the resulting detailed SR mesh. By cutting these effects from the detailed SR mesh and associating them with the representation of the person, the embodiments are able to track how a person walks down a set of stairs. This data or knowledge can then be used or imputed into other applications and can even be used to generate simulated persons walking down stairs in other scenarios.

In this regard, some embodiments incorporate a temporal aspect by being able to monitor and track dynamically moving objects. Such tracking can be performed in real-time. Furthermore, the embodiments are able to continuously or periodically perform the cutting operation on the detailed SR mesh so as to generate a clutter object mesh specifically for the dynamically moving object (e.g., by cutting against the static environment to identify dynamic objects).

In some cases, it is desirable to generate world-locked holograms 1355 (i.e. holograms that remain in place relative to a world environment) while in other scenarios it is desirable to generate object-locked holograms 1360 (i.e. holograms that remain in place relative to a particular object, regardless of whether that object is moving within an environment). By performing the disclosed operations, the quality of both world-locked holograms 1355 and object-locked holograms 1360 can be significantly improved. For instance, building on the layering aspect mentioned earlier, the embodiments are able to selectively utilize much smaller meshes (e.g., discrete clutter meshes) as opposed to uses a comprehensive single mesh. Operating on a smaller set of data (i.e. discrete clutter meshes) will enable the computer system to render and use holograms in a more efficient manner.

Use of the Clutter Mesh(es)

Figure 14:
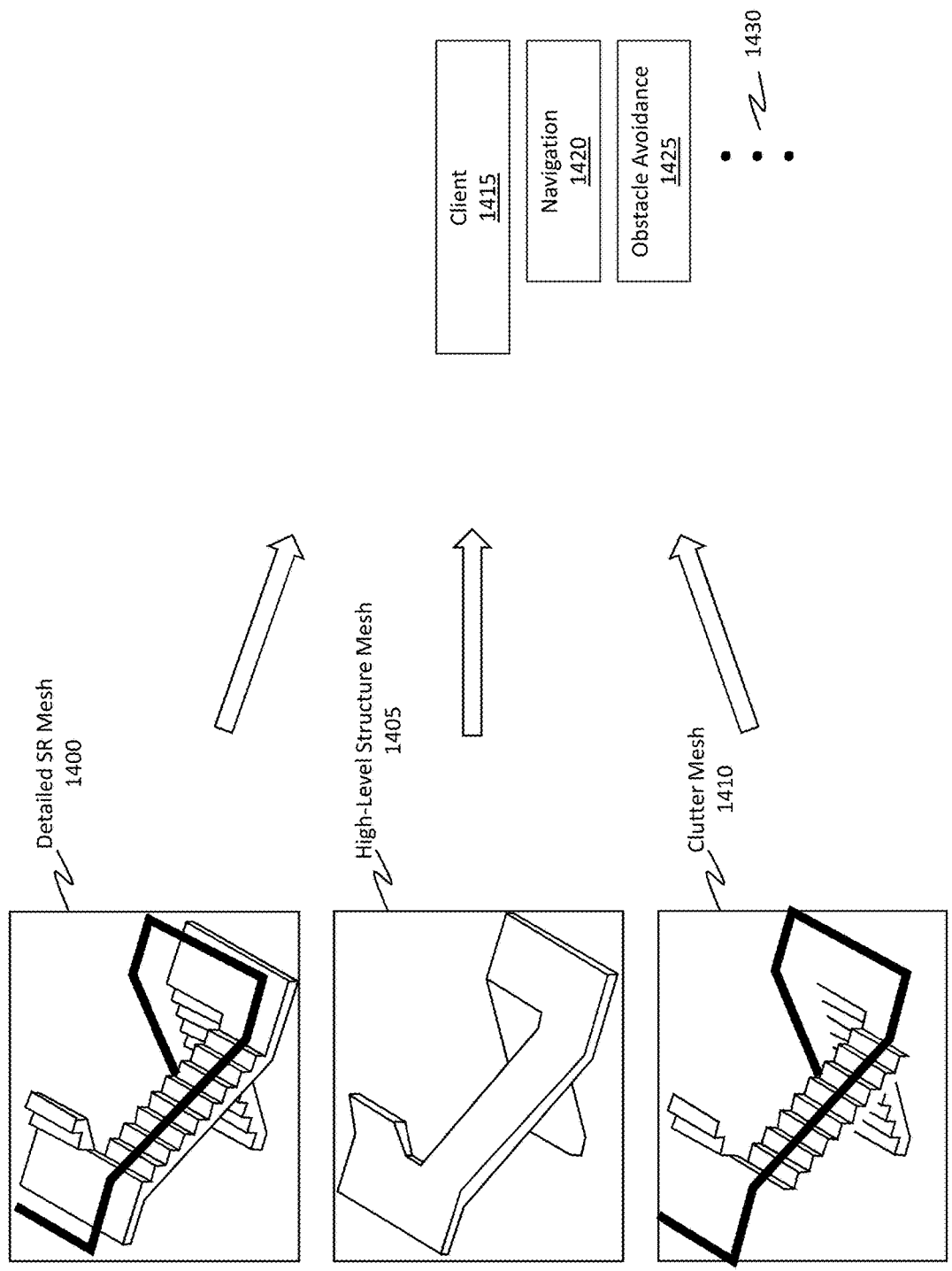
FIG. 14 illustrates how the detailed SR mesh, the high-level structure mesh, and even various parts of the clutter mesh can be provided to a client device (or even the original scanning device) for use in any number of different applications.

FIG. 14 illustrates some example use cases in which the disclosed SR meshes may be used. FIG. 14 specifically illustrates a detailed SR mesh 1400, a high-level structure mesh 1405, and a clutter mesh 1410. Each of these is representative of its corresponding mesh equivalents discussed throughout this disclosure.

Depending on the design criteria, the embodiments are able to provide any one or combination of the detailed SR mesh 1400, the high-level structure mesh 1405, and/or the clutter mesh 1410 (which may actually include multiple meshes, with a single mesh corresponding to a single object) to a client 1415. Notably, the client 1415 can be a separate computer system or perhaps an application executing on the same device that generated the different meshes. The embodiments can provide one or any number of the discrete clutter object SR meshes to the client 1415.

The client 1415 can then use the different meshes in any number of ways. By way of example and without limitation, the client 1415 can use the meshes for navigation 1420 (e.g., to direct a user where to go within an environment) or even for obstacle avoidance 1425 (e.g., by projecting bounding boxes around objects identified by the clutter mesh 1410 and directing the user to avoid the bounding box). The ellipsis 1430 represents how the client 1415 is able to use the meshes in any number of ways, without limitation.

Accordingly, the disclosed embodiments improve how SR meshes are generated and used. In particular, the embodiments are able to strip away structural features from a detailed SR mesh in order to decompose that detailed SR mesh into a simpler compilation of multiple discrete SR meshes, with each individual mesh effectively representing a separate object. By performing the disclosed operations, the embodiments are able to dramatically improve the usage and manageability of SR meshes.

The embodiments are also able to improve the accuracy of SR meshes by performing the disclosed completion operations. For instance, cutting the high-level 3D structural representation from the detailed 3D representation can include initially detecting a condition in which an overlapping SR polygon (e.g., a 3D triangle) overlaps a particular division between a part of the structure (or perhaps a non-structural object) and a particular object included in the environment. Then, the overlapping SR polygon (e.g., 3D triangle) can be cut from the detailed 3D representation during the cut. A presence of a hole in a particular remaining object (e.g., occurring as a result of the overlapping SR polygon being cut) can be identified. This particular remaining object corresponds to the particular object included in the environment. To improve the accuracy of the mesh, the embodiments are able to perform the completion operation mentioned earlier to fill in the hole to resolve a seam of the particular remaining object.

Example Computer/Computer Systems

Attention will now be directed to FIG. 15 which illustrates an example computer system 1500 that may include and/or be used to perform any of the operations described herein. Computer system 1500 may take various different forms. For example, computer system 1500 may be embodied as a tablet, a desktop, a laptop, a mobile device, a cloud device, an HMD, or a standalone device, such as those described throughout this disclosure. Computer system 1500 may also be a distributed system that includes one or more connected computing components/devices that are in communication with computer system 1500. FIG. 15 specifically calls out how computer system 1500 may be embodied as a tablet 1500A, a laptop 1500B, or an HMD 1500C, but the ellipsis 1500D illustrates how computer system 1500 may be embodied in other forms as well.

In its most basic configuration, computer system 1500 includes various different components. FIG. 15 shows that computer system 1500 includes one or more processor(s) 1505 (aka a "hardware processing unit"), input/output (I/O) 1510, a depth system 1515, a ML engine 1520, a scene recognition 1525 engine, and storage 1530.

Regarding the processor(s) 1505, it will be appreciated that the functionality described herein can be performed, at least in part, by one or more hardware logic components (e.g., the processor(s) 1505). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

I/O 1510 includes any type of input or output device. Such devices include, but are not limited to, touch screens, displays, a mouse, a keyboard, and so forth. Any type of input or output device should be included among I/O 1510, without limitation.

Depth system 1515 may include the scanning sensor(s) 105 from FIG. 1 as well as any resources or processes used to process the scanning data. In some cases, depth system 1515 may include any number or type of depth camera. For instance, the cameras can include any type of thermal camera (or thermal imaging sensor), any type of visible light camera, and any type of depth detection camera. Similarly, any type of depth detector may be included among the cameras. Examples include, but are not limited to, stereoscopic cameras (both active illumination and passive (i.e. no illumination)), time of flight cameras, range finders, or any other type of range or depth sensor. These different sensing units can be used to obtain SR data.

Returning to FIG. 15, the ML engine 1520 is representative of the ML engine 440 from FIG. 4. ML engine 1520 may be implemented as a specific processing unit (e.g., a dedicated processing unit as described earlier) configured to perform one or more specialized operations for the computer system 1500. As used herein, the terms "executable module," "executable component," "component," "module," or "engine" can refer to hardware processing units or to software objects, routines, or methods that may be executed on computer system 1500. The different components, modules, engines, and services described herein may be implemented as objects or processors that execute on computer system 1500 (e.g. as separate threads). The ML engine 1520 (or perhaps even just the processor(s) 1505) can be configured to perform any of the disclosed method acts or other functionalities.

Scene recognition 1525 can be included as a subpart of the ML engine 1520, or it can be a separate computation resource. Scene recognition 1525 is able to identify objects within scanning data (e.g., the volumetric data structure mentioned earlier).

Storage 1530 may be physical system memory, which may be volatile, non-volatile, or some combination of the two. The term "memory" may also be used herein to refer to non-volatile mass storage such as physical storage media. If computer system 1500 is distributed, the processing, memory, and/or storage capability may be distributed as well.

Storage 1530 is shown as including executable instructions (i.e. code 1535). The executable instructions (i.e. code 1535) represent instructions that are executable by the processor(s) 1505 of computer system 1500 to perform the disclosed operations, such as those described in the various methods. Storage 1530 is also shown as including data 1540. Data 1540 may include any type of data, including the scanning data, pose data, DNN data, the volumetric data structure, the meshes, and so forth, without limitation.

The disclosed embodiments may comprise or utilize a special-purpose or general-purpose computer including computer hardware, such as, for example, one or more processors (such as processor(s) 1505) and system memory (such as storage 1530), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1500 may also be connected (via a wired or wireless connection) to external sensors (e.g., one or more remote cameras) or devices via a network 1545. For example, computer system 1500 can communicate with any number devices or cloud services to obtain or process data. In some cases, network 1545 may itself be a cloud network. Furthermore, computer system 1500 may also be connected through one or more wired or wireless networks 1545 to remote/separate computer systems(s) that are configured to perform any of the processing described with regard to computer system 1500.

A "network," like network 1545, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1500 will include one or more communication channels that are used to communicate with the network 1545. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   a processor; and
   a computer-readable hardware storage device having stored thereon computer-executable instructions that are executable by the processor to configure the computer system to at least:
   access surface reconstruction (SR) data corresponding to an environment;
   use the SR data to generate a detailed three-dimensional (3D) representation of the environment, the detailed 3D representation comprising representations of one or more objects in the environment that include a particular detail;
   use the SR data to infer a high-level 3D structural representation of the environment, the high-level 3D structural representation representing a particular structural feature of the one or more objects while omitting the particular detail that is represented in the detailed 3D representation, the high-level 3D structural representation being inferred using machine learning that is performed on the surface reconstruction data to identify the particular structural feature;
   remove the particular structural feature of the high-level 3D structural representation from the detailed 3D representation to generate a clutter mesh comprising remaining objects, the removing of the particular structural feature comprising removing the particular structural feature from the representations of the one or more objects that include the particular detail such that the remaining objects include the particular detail while omitting the particular structural feature; and
   perform semantic segmentation on the remaining objects.

2. The computer system of claim 1, wherein the high-level 3D structural representation is a watertight mesh.

3. The computer system of claim 1, wherein each object included in the remaining objects is associated with a distinct corresponding 3D representation as a result of the removing.

4. The computer system of claim 1, wherein the structure of the environment includes one or more of a wall structure, a ceiling structure, or a floor structure of the environment.

5. The computer system of claim 1, wherein the SR data includes depth data, pose data, and deep neural network (DNN) data associated with the environment.

6. The computer system of claim 1, wherein the structure of the environment includes planar regions having a size that satisfies a size threshold.

7. The computer system of claim 1, wherein the high-level 3D structural representation includes different types of geometric shapes, including a plane or a cylinder, and wherein removing the particular structural feature of the high-level 3D structural representation from the detailed 3D representation includes removing at least the plane or the cylinder from the detailed 3D representation.

8. The computer system of claim 1, wherein removing the particular structural feature of the high-level 3D structural representation from the detailed 3D representation to generate the clutter mesh includes:
grouping candidate SR data together to represent a specific object included in the remaining objects, wherein the grouping is performed based on a selected set of grouping conditions that are required to be satisfied for the candidate SR data to be grouped together.

9. The computer system of claim 8, wherein the selected set of grouping conditions includes a proximity requirement for the candidate SR data, the proximity requirement requiring each data item included in the candidate SR data to be within a threshold distance of at least one other data item included in the candidate SR data.

10. The computer system of claim 8, wherein the selected set of grouping conditions includes:
a statistical property variance requirement for the candidate SR data; or
a model fitting requirement for the candidate SR data.

11. A method for identifying clutter objects included within surface reconstruction (SR) data, said method comprising:
accessing SR data corresponding to an environment;
using the SR data to generate a detailed three-dimensional (3D) representation of the environment, the detailed 3D representation comprising representations of one or more objects in the environment that include a particular detail;
using the SR data to infer a high-level 3D structural representation of the environment, the high-level 3D structural representation representing a particular structural feature of the one or more objects while omitting the particular detail that is represented in the detailed 3D representation, the high-level 3D structural representation being inferred using machine learning that is performed on the surface reconstruction data to identify the particular structural feature;
removing the particular structural feature of the high-level 3D structural representation from the detailed 3D representation to generate a clutter mesh comprising remaining objects, the removing of the particular structural feature comprising removing the particular structural feature from the representations of the one or more objects that include the particular detail such that the remaining objects include the particular detail while omitting the particular structural feature; and
performing semantic segmentation on the remaining objects.

12. The method of claim 11, wherein removing the particular structural feature of the high-level 3D structural representation from the detailed 3D representation to generate the clutter mesh includes filtering out at least some remaining SR data included in the clutter mesh, the at least some remaining SR data being filtered as a result of the at least some remaining SR data failing to satisfy a selected set of grouping conditions.

13. The method of claim 11, wherein each object included in the remaining objects is associated with a distinct corresponding 3D representation as a result of the removing, each one of said 3D representations being configurable for display, and wherein each one of said 3D representations, when displayed, is displayed with a corresponding display format.

14. The method of claim 11, wherein the detailed 3D representation and the high-level 3D structural representation are comprised of 3D triangles used to represent the environment three-dimensionally.

15. The method of claim 14, wherein removing the particular structural feature of the high-level 3D structural representation from the detailed 3D representation includes:
detecting a condition in which an overlapping 3D triangle overlaps a particular division between a part of the structure and a particular object included in the environment;
cutting the overlapping 3D triangle from the detailed 3D representation during the removing;
identifying a presence of a hole in a particular remaining object as a result of the overlapping 3D triangle being cut, the particular remaining object corresponding to said particular object included in the environment; and
performing a completion operation to fill in the hole to resolve a seam of the particular remaining object.

16. The method of claim 14, wherein a number of 3D triangles included in the high-level 3D structural representation is an order of magnitude less than a number of 3D triangles included in the detailed 3D representation.

17. The method of claim 14, wherein a number of 3D triangles included in the clutter mesh is less than a number of 3D triangles included in the detailed 3D representation.

18. The method of claim 11, wherein the SR data is obtained using a time-of-flight (TOF) depth system, an active stereo camera system, a passive stereo camera system, or a motion stereo camera system.

19. One or more hardware storage devices having stored thereon computer-executable instructions that are executable by one or more processors of a computer system to cause the computer system to at least:
access surface reconstruction (SR) data corresponding to an environment;
use the SR data to generate a detailed three-dimensional (3D) representation of the environment, the detailed 3D representation comprising representations of one or more objects in the environment that include a particular detail;
use the SR data to infer a high-level 3D structural representation of the environment, the high-level 3D structural representation representing a particular structural feature of the one or more objects while omitting the particular detail that is represented in the detailed 3D representation, the high-level 3D structural representation being inferred using machine learning that is performed on the surface reconstruction data to identify the particular structural feature;

remove the particular structural feature of the high-level 3D structural representation from the detailed 3D representation to generate a clutter mesh comprising remaining objects, the removing of the particular structural feature comprising removing the particular structural feature from the representations of the one or more objects that include the particular detail such that the remaining objects include the particular detail while omitting the particular structural feature; and perform semantic segmentation on the remaining objects.

20. The one or more hardware storage devices of claim 19, wherein the machine learning used to identify the structure of the environment uses a structure definition parameter to determine which environmental features constitute structural features of the environment.

* * * * *